United States Patent
Xiao et al.

(10) Patent No.: US 10,990,849 B2
(45) Date of Patent: Apr. 27, 2021

(54) SAMPLE SCREENING METHOD AND APPARATUS, AND SERVICE OBJECT DATA SEARCHING METHOD AND APPARATUS

(71) Applicant: Alibaba Group Holding Limited, Grand Cayman (KY)

(72) Inventors: Fei Xiao, Hangzhou (CN); Shichen Liu, Hangzhou (CN); Wenwu Ou, Hangzhou (CN); Si Luo, Seattle, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 336 days.

(21) Appl. No.: 16/035,263

(22) Filed: Jul. 13, 2018

(65) Prior Publication Data
US 2019/0019064 A1    Jan. 17, 2019

(30) Foreign Application Priority Data
Jul. 14, 2017    (CN) .......................... 201710577080.0

(51) Int. Cl.
| G06K 9/62 | (2006.01) |
| G06F 17/18 | (2006.01) |
| G06F 16/9038 | (2019.01) |
| G06F 16/9032 | (2019.01) |
| G06F 16/903 | (2019.01) |

(52) U.S. Cl.
CPC ....... *G06K 9/6257* (2013.01); *G06F 16/9038* (2019.01); *G06F 16/90332* (2019.01); *G06F 16/90335* (2019.01); *G06F 17/18* (2013.01)

(58) Field of Classification Search
CPC .... G06F 16/21; G06F 19/328; G06F 19/3418; G06F 21/32; G06F 21/34
USPC .......... 707/600–831, 899, 999.001–999.206
See application file for complete search history.

(56) References Cited

U.S. PATENT DOCUMENTS

| 8,170,306 B2 * | 5/2012 | Yu .......................... G06T 7/0012 |
| | | 382/128 |
| 2005/0080462 A1 * | 4/2005 | Jenkins ............... G06F 19/3481 |
| | | 607/58 |
| 2006/0013454 A1 | 1/2006 | Flewelling et al. |

(Continued)

OTHER PUBLICATIONS

PCT Invitation to Pay Additional Fees mailed Sep. 11, 2018 for PCT Application No. PCT/US18/42109, 2 pages.

(Continued)

*Primary Examiner* — Angelica Ruiz
(74) *Attorney, Agent, or Firm* — Lee & Hayes, P.C.

(57) ABSTRACT

A method and an apparatus of screening samples, and a method and an apparatus of searching for service object data are provided. The method of screening samples includes setting up a plurality of screening layers; selecting training samples needed by a current screening layer in the plurality of screening layers; extracting target sample features suitable for the current screening layer from the training samples; determining a screening quantity suitable for the current screening layer using the target sample features; and screening target samples based on the target sample features and the screening quantity. The embodiments of the present disclosure can adaptively adjust respective screening quantities of various screening layers, and can maximally optimize resources, thus balancing effects and performance.

20 Claims, 10 Drawing Sheets

(56) References Cited

U.S. PATENT DOCUMENTS

| | | | |
|---|---|---|---|
| 2007/0244375 A1* | 10/2007 | Jenkins | A61N 1/36085 600/301 |
| 2009/0019552 A1* | 1/2009 | McLaughlin | G06Q 40/00 726/27 |
| 2009/0177655 A1 | 7/2009 | Goel et al. | |
| 2009/0228471 A1 | 9/2009 | Dawson et al. | |
| 2010/0022406 A1* | 1/2010 | Srinivasan | G06Q 30/06 506/9 |
| 2010/0063948 A1 | 3/2010 | Virkar et al. | |
| 2011/0078171 A1 | 3/2011 | Wagenblatt et al. | |
| 2012/0023102 A1 | 1/2012 | Venkataraman et al. | |
| 2012/0183187 A1 | 7/2012 | Sasaki et al. | |
| 2012/0301887 A1* | 11/2012 | Bankaitis-Davis | C12Q 1/6886 435/6.12 |
| 2013/0225417 A1* | 8/2013 | Srinivasan | G06Q 99/00 506/2 |
| 2013/0323744 A1* | 12/2013 | Hahn | C12Q 1/6886 435/6.12 |
| 2014/0201203 A1 | 7/2014 | Krishna et al. | |
| 2015/0039625 A1 | 2/2015 | Nisbet et al. | |
| 2016/0068915 A1* | 3/2016 | Kennedy | G16B 25/00 506/2 |
| 2016/0174902 A1 | 6/2016 | Georgescu et al. | |
| 2017/0147775 A1* | 5/2017 | Ohnemus | G16H 10/20 |

OTHER PUBLICATIONS

PCT Search Report and Written Opinion dated Nov. 14, 2018, for PCT Application No. PCT/US18/42109, 10 pages.

* cited by examiner

SAMPLE SCREENING METHOD AND APPARATUS, AND SERVICE OBJECT DATA SEARCHING METHOD AND APPARATUS

CROSS REFERENCE TO RELATED PATENT APPLICATIONS

This application claims priority to Chinese Patent Application No. 201710577080.0, filed on 14 Jul. 2017, entitled "Method and Apparatus for Displaying Search Results," which are hereby incorporated by reference in its entirety.

TECHNICAL FIELD

The present disclosure relates to the technical field of computer processing, and particularly to sample screening methods, service object data search methods, and corresponding sample screening apparatuses, and corresponding service object data searching apparatuses.

BACKGROUND

Service object data (such as commodities, web pages, etc.) in the Internet are generated in an increasingly faster pace, with the number of categories thereof continuously increasing. As user requirements have become greater, an evolution from an initial matching of search keywords to personalized recommendations for the users has been made.

In a setting for personalized recommendation, cascade models, such as a soft cascade model, a hard cascade model, etc., are relatively commonly used for screening recommended objects. However, given circumstances about online applications of training strategies that are based on cascade models, a theoretical processing cost (e.g., time consumption) is inconsistent with an actual processing cost (e.g., time consumption), resulting in an inaccuracy of a model total cost (e.g., a sum of resource costs such as time consumption and memory). Furthermore, a same number of filters are set for all types of service object data in a cascade model, while the qualities of the service object data are different, resulting in a decrease in search accuracy and a waste of computing resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure are proposed to provide a method and a corresponding apparatus for screening samples, and a method and a corresponding apparatus for searching service object data, to overcome the above problems or at least partially solve the above problems.

In order to solve the above problems, the present disclosure discloses a method for screening samples. The method includes:

setting up a plurality of screening layers;

selecting training samples needed by a current screening layer in the plurality of screening layers;

extracting target sample features suitable for the current screening layer from the training samples;

determining a screening quantity suitable for the current screening layer using the target sample features; and screening target samples based on the target sample features and the screening quantity.

In implementations, a number of the training samples needed by the current screening layer is more than a number of training samples needed by a next screening layer, the target sample features suitable for the current screening layer include target sample features suitable for a previous screening layer, and the screening quantity suitable for the current screening layer is greater than a screening quantity for the next screening layer.

In implementations, the training samples are service object data matched with search keyword(s), and the method further includes generating an association relationship between the search keyword(s) and the screening quantity.

In implementations, extracting the target sample features suitable for the current screening layer from the training samples includes:

extracting original sample features from the training samples; determining original sample weights of the original sample features;

generating cost-performance parameters based on the original sample weights; and extracting the target sample features from the original sample features according to the cost-performance parameters.

In implementations, the original sample weights are important degree factors of the original sample features with respect to preset first optimization target parameter(s).

Generating the cost-performance parameters according to the original sample weights further includes:

pre-configuring cost coefficients of processing the original sample features; and calculating ratios between the original sample weights and the cost coefficients as the cost-performance parameters.

In implementations, the service object data is commodity data. The original sample features include commodity quality parameters, after-sales service evaluation parameters, conversion rates, and cheating score parameters of the commodity data. The first optimization target parameter(s) include(s) commodity data transaction volume. The cost coefficients of processing the original sample features include time consumption, a memory application rate, and a CPU occupancy rate.

In implementations, determining the screening quantity suitable for the current screening layer using the target sample features includes:

determining target sample weights of the target sample features;

generating a screening probability that the training samples enter a next screening layer based on the target sample weights; and calculating the screening quantity of training samples to be screened at the current screening layer using the screening probability.

In implementations, the target sample weights are important degree factors of the target sample features with respect to preset second optimization target parameter(s).

The second optimization target parameter(s) include(s) one or more of the following:

an accuracy rate of screening the training samples, a total cost factor used for processing training samples that enter the current screening layer, and a number of training samples that enter the last screening layer.

In implementations, generating the screening probability that the training samples enter the next screening layer based on the target sample weights further includes:

calculating an inner product of the target sample weights for the target sample features of the current screening layer; and mapping the inner product into an interval of 0-1 to obtain the screening probability.

In implementations, calculating the screening quantity of the training samples to be screened at the current screening layer using the screening probability further includes:

determining a baseline screening quantity, the baseline screening quantity being a screening quantity suitable for the previous screening layer; and attenuating the screening probability based on the baseline screening quantity to obtain the screening quantity of the training samples to be screened at the current layer.

In implementations, the method further includes:

determining whether all preset screening layers are traversed;

taking selected target samples as final samples if affirmative; and returning to the determining of the training samples needed by the current screening layer if not.

In implementations, the method further includes pushing the final samples to a user.

The embodiments of the present disclosure also disclose a method for searching service object data. The method involves searching for service object data in a plurality of screening layers, and specifically includes:

receiving a search keyword;

searching for initial service object data that matches the search keyword;

querying a respective screening quantity of each screening layer associated with the search keyword;

extracting target sample features suitable for each screening layer from the initial service object data; and selecting target service object data satisfying a screening quantity of a corresponding screening layer based on the target sample features.

In implementations, selecting the target service object data meeting the screening quantity of the corresponding screening layer based on the target sample features includes:

calculating respective scores of the initial service object data using the target sample features in a current screening layer;

sorting the initial service object data according to the scores;

outputting the screening quantity of the sorted service object data to a next screening layer when the current screening layer is not a final screening layer; and setting the screened service object data as target service object data when the current filter layer is the final screening layer.

The embodiments of the present disclosure also disclose a method for screening samples. The method includes:

setting up a plurality of screening layers;

extracting target sample features suitable for the plurality of screening layers according to a training objective;

determining a screening quantity suitable for the plurality of screening layers using target sample features; and selecting target samples according to the target sample features and the screening quantity.

In implementations, the plurality of screening layers includes at least two screening layers, wherein a number of training samples needed by a previous screening layer is more than a number of training samples needed by a next screening layer, target sample features for the next screening layer include target sample features of the previous screening layer, and a screening quantity of the previous screening layer is greater than a screening quantity of the next screening layer.

The embodiments of the present disclosure disclose an apparatus for screening samples. The apparatus includes:

a screening layer setting module used for setting up a plurality of screening layers;

a sample determination module used for selecting training samples needed by a current screening layer in the plurality of screening layers;

a feature extraction module used for extracting target sample features suitable for the current screening layer from the training samples;

a quantity calculation module used for determining a screening quantity suitable for the current screening layer using the target sample features; and a screening processing module used for screening target samples based on the target sample features and the screening quantity.

In implementations, a number of the training samples needed by the current screening layer is more than a number of training samples needed by a next screening layer, the target sample features suitable for the current screening layer include target sample features suitable for a previous screening layer, and the screening quantity suitable for the current screening layer is greater than a screening quantity for the next screening layer.

In implementations, the training samples are service object data matched with search keyword(s), and the apparatus further includes:

a relationship establishing module used for generating an association relationship between the search keyword(s) and the screening quantity.

In implementations, the feature extraction module includes:

an original sample feature extraction sub-module used for extracting original sample features from the training samples;

an original sample weight calculation sub-module used for determining original sample weights of the original sample features;

a cost-performance parameter generation sub-module used for generating cost-performance parameters based on the original sample weights; and a target sample feature extraction sub-module used for extracting the target sample features from the original sample features according to the cost-performance parameters.

In implementations, the original sample weights are important degree factors of the original sample features with respect to preset first optimization target parameter(s).

The cost-performance parameter generation sub-module further includes:

a cost coefficient pre-configuration unit used for pre-configuring cost coefficients of processing the original sample features; and a cost-performance ratio calculation unit used for calculating ratios between the original sample weights and the cost coefficients as the cost-performance parameters.

In implementations, the quantity calculation module includes:

a target sample weight calculation sub-module used for determining target sample weights of the target sample features;

a screening probability generation sub-module used for generating a screening probability that the training samples enter a next screening layer based on the target sample weights; and a screening quantity calculation sub-module used for calculating the screening quantity of training samples to be screened at the current screening layer using the screening probability.

In implementations, the target sample weights are important degree factors of the target sample features with respect to preset second optimization target parameter(s).

The second optimization target parameter(s) include(s) one or more of the following:

an accuracy rate of screening the training samples, a total cost factor used for processing training samples that enter the current screening layer, and a number of training samples that enter the last screening layer.

In implementations, the screening probability generation sub-module further includes:

an inner product calculation unit used for calculating an inner product of the target sample weights for the target sample features of the current screening layer; and a mapping unit used for mapping the inner product into an interval of 0-1 to obtain the screening probability.

In implementations, the screening quantity calculation sub-module further includes:

a baseline determination unit used for determining a baseline screening quantity, the baseline screening quantity being a screening quantity suitable for the previous screening layer; and an attenuation unit used for attenuating the screening probability based on the baseline screening quantity to obtain the screening quantity of the training samples to be screened at the current layer.

In implementations, the apparatus further includes:

a traversal module used for determining whether all preset screening layers are traversed, calling a final sample determination module if affirmative, and calling the sample determination unit if not; and the final sample determination module used for taking selected target samples as final samples.

The embodiments of the present disclosure also disclose an apparatus for searching service object data. The apparatus involves searching for service object data in a plurality of screening layers, and specifically includes:

a keyword receiving module used for receiving a search keyword;

a keyword searching module used for searching for initial service object data that matches the search keyword;

a screening quantity querying module used for querying a respective screening quantity of each screening layer associated with the search keyword;

a sample extraction module used for extracting target sample features suitable for each screening layer from the initial service object data; and a selection processing module used for selecting target service object data satisfying a screening quantity of a corresponding screening layer based on the target sample features.

In implementations, the selection processing module includes:

a score calculation sub-module used for calculating respective scores of the initial service object data using the target sample features in a current screening layer;

a sorting sub-module used for sorting the initial service object data according to the scores;

a data outputting sub-module used for outputting the screening quantity of the sorted service object data to a next screening layer when the current screening layer is not a final screening layer; and a result determination sub-module used for setting the screened service object data as target service object data when the current filter layer is the final screening layer.

The embodiments of the present disclosure also disclose an apparatus for screening samples. The apparatus includes:

one or more processors, and one or more machine readable media storing instructions that, when executed by the one or more processors, cause the apparatus to perform the above method.

The embodiments of the present disclosure also disclose one or more machine readable media storing instructions that, when executed by the one or more processors, cause an apparatus to perform the above method.

The embodiments of the present disclosure have the following advantages.

The cascade model applied in the embodiments of the present disclosure has a plurality of screening layers. When training samples are screened at each screening layer, a screening quantity of screening layers at each level can be dynamically adjusted according to target sample features of the training samples, thus screening a suitable number of target samples with high quality. This can save computing resources while ensuring high search accuracy.

The embodiments of the present disclosure can adaptively adjust a screening quantity (ranksize) of each screening layer. Service object data is used as an example. If a quantity of service object data with good quality under a search keyword is relatively large, a screening quantity (ranksize) will be dynamically increased. On the contrary, if a quantity of service object data with good quality under a search keyword is relatively small, a screening quantity (ranksize) will be dynamically decreased. As such, resources are optimized, and effects and performance are balanced.

The embodiments of the present disclosure calculate a screening quantity of each screening layer based on factors such as an accuracy of screening training samples, a total cost coefficient used for processing training samples entering a current screening layer, a number of training samples entering a final screening layer, etc., for dynamic adjustment. This can optimize the sample screening effect and performance, and at the same time achieve a goal of returning not too few results when the number of search results is small and returning not too many results when the number of search results is large.

In the embodiments of the present disclosure, a screening quantity of training samples screened from a current screening layer into a next screening layer is calculated through a screening probability of training samples screened by the current screening layer into the next screening layer, thus satisfying an approach of calculating a total cost, resulting in the consistency between a theoretical processing cost (such as time consumption) and an actual processing cost (such as time consumption), and ensuring the accuracy of a total model cost (a sum of resource costs such as time consumption, memory, etc.).

DETAILED DESCRIPTION

Figure 1:
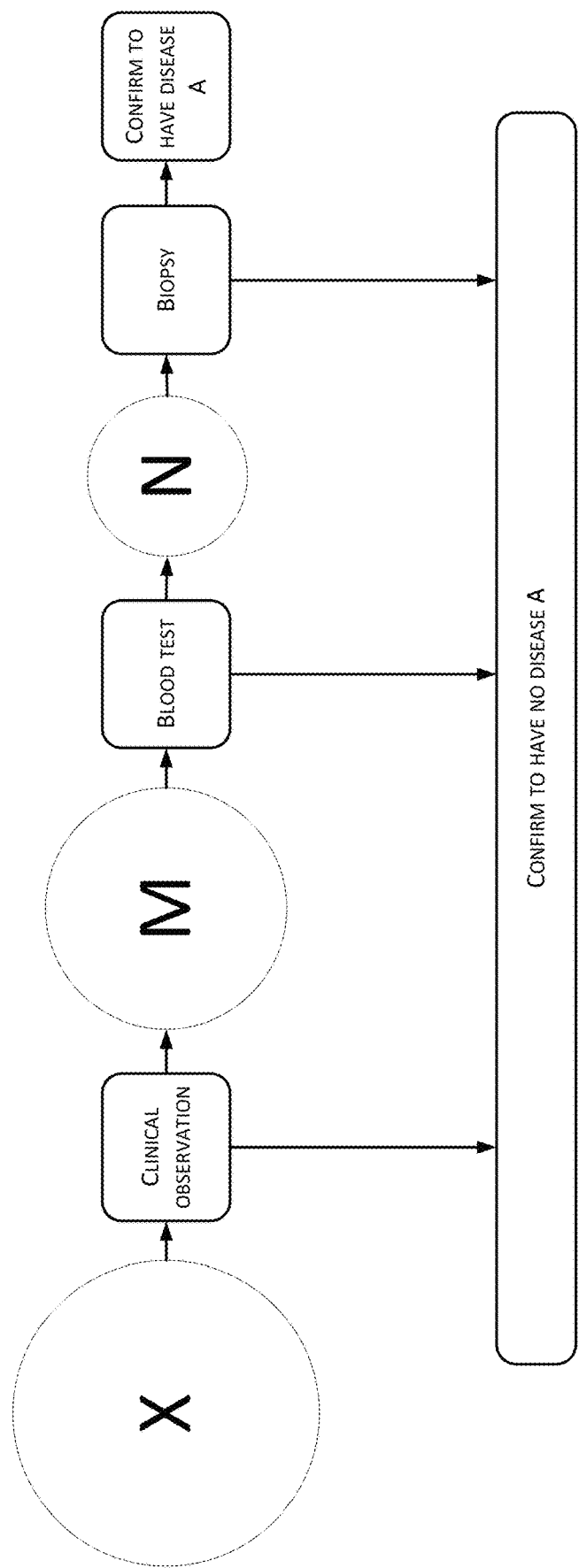
FIG. 1 is a schematic diagram of constructing a layered model.

In order to enable the above goals, features and advantages of the present disclosure to be understood more easily, the present disclosure is described in further detail in conjunction with accompanying drawings and particular implementations.

The concepts of the present disclosure are susceptible to various modifications and alternative forms. Particular embodiments thereof have been shown in a form of drawings, and will be described in detail herein. It should be understood, however, that the above content is not intended to limit the concepts of the present disclosure to particular forms that are disclosed. Rather, the specification and appended claims of the present disclosure are intended to cover all modifications, equivalents, and alternatives.

"An embodiment", "embodiments", and "a particular embodiment" etc., in the present specification represent that the described embodiments may include particular features, structures, or characteristics. However, each embodiment may or may not necessarily include these particular features, structures or characteristics. Moreover, such phrases do not necessarily refer to the same embodiment. In addition, when a particular feature, structure, or characteristic is described in connection with an embodiment, whether explicitly described or not, it can be considered that such feature, structure or characteristic is also related to other embodiments within the knowledge of one skilled in the art. Furthermore, it should be understood that items included in a list in a form of "at least one of A, B, and C" may include the following possible items: (A); (B); (C); (A and B); (A and C); (B and C); or (A, B and C). Similarly, items listed in a form of "at least one of A, B or C" may mean (A); (B); (C); (A and B); (A and C); (B and C); or (A, B, and C).

In cases, the disclosed embodiments may be implemented as hardware, firmware, software, or any combination thereof. The disclosed embodiments can also be implemented as instructions that are carried or stored in one or more non-transitory machine-readable (e.g., computer-readable) storage media. The instructions can be executed by one or more processors. A machine-readable storage media may be implemented as a storage device, mechanism, or other physical structure used for storing or transmitting information in a form that can be read by a machine (e.g., volatile or non-volatile memory, a media disk, other media, or other physical structural device).

In the drawings, some structural or method features may be shown in a particular arrangement and/or order. Nevertheless, in implementations, such specific arrangement and/or order are not necessary. Rather, in some embodiments, such features may be arranged in different manners and/or orders, rather than the ones as shown in the drawings. Moreover, content included in a particular feature in a structure or method in a particular drawing is not meant to imply that such feature is essential in all embodiments. Moreover, in some embodiments, this feature may not be included, or this feature is combined with other features.

To facilitate the understanding of the present disclosure by one skilled in the art, a cascade model is described hereinafter. The cascade model mainly involves a selection of soft cascade model, a hard cascade model, etc. In a setting of personalized recommendation, a cascade model is generally used for selecting recommended objects such as mass selection and fine screening. A basic idea of a soft cascade is to have the soft cascade to perform selection from an upper layer to a lower layer according to a defined screening probability. Hard cascade is to directly extract the highest ranked N (N is a positive integer, i.e., topN) positions into a next layer for processing. Generally, online systems are implemented as a hard cascade.

For example, many applications in daily life require features, and an acquisition of features usually requires a certain cost. For example, when medical diagnosis of a cause of a patient is needed, characteristics of clinical observations (e.g., gender, age, body temperature, etc.), blood test characteristics (i.e., characteristics obtained by a blood test), biopsy, etc., are needed to be obtained. In order to obtain all these characteristics, the patient is required to undergo all of the above checks, leading to a progressive increase in discomfort of the patient.

In this case, a hierarchical model can be designed to early diagnose causes of patients, without the need for all the patients to complete all tests before definitive diagnosis of whether to have certain diseases can be made. Specifically, FIG. 1 is a schematic diagram of a hierarchical model construction 100. To diagnose whether a patient has A disease, clinical observations are first performed for X patient who visit doctors. M patients who are suspected of having the A disease are selected to do a blood test through the clinical observations. At the same time, X-M patients are determined to have no A disease. These X-M patients no longer need to receive follow-up examinations.

N patients are then screened and selected from the M patients who are suspected of having A disease through the blood tests. These N patients are needed to undergo biopsy due to additional ground of suspicion of having the A disease. Meanwhile, M-N patients are determined to have no A disease, and these M-N patients no longer need to receive follow-up examinations.

The above N patients can be determined whether to have the A disease after undergoing biopsy. As can be seen, a diagnostic process designed through the above-mentioned hierarchical model can minimize the pain of patients on a premise of ensuring the accuracy.

Figure 2:
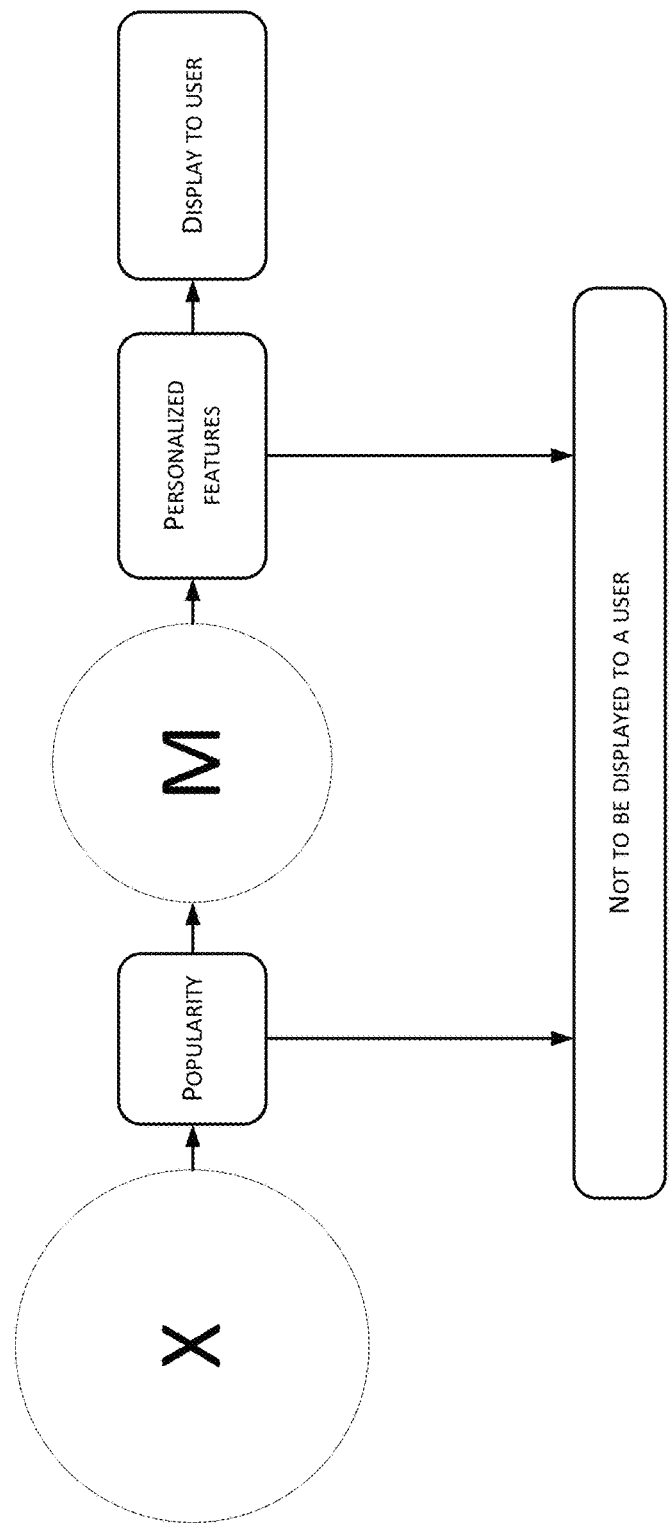
FIG. 2 is another schematic diagram of constructing a layered model.

For another example, with reference to a schematic diagram of another hierarchical model construction 200 as shown in FIG. 2, in an application of an e-commerce platform, a commodity data pool is assumed to have X commodity data. First, M pieces of commodity data having good quality are screened and selected from the commodity data pool according to the basic features (such as sales volume of commodity data, popularity, web page traffic, etc.), and N pieces of commodity data are further screened and determined from among the M pieces of commodity data based on a user's personalized features, to be pushed to the user. At the same time, X-M pieces of commodity data are also determined to be not pushed to the user.

In an existing solution, a target Loss (e.g., time consumption) for processing a search keyword when optimizing a target parameter using a cascade model is:

$$Loss = \beta \frac{1}{N} \sum_{i=1}^{N} \left[ t_1 + \sum_{j=2}^{k} t_j \sigma(f_{c_1}(x_i)) \right]$$

A Loss (e.g., time consumption) of online processing of a search keyword in practice is:

$$Loss = \beta \frac{1}{N} [t_1 * N + t_j * ranksize_j]$$

$$\text{where } ranksize' = \underset{(ranksize)}{\operatorname{argmax}} AUC(ranksize)$$

Apparently, $[t_1 + \Sigma_{j=2}^{k} t_j \sigma(f_{c_1}(x_i))]$ may not be equal to $t_j * ranksize_j$, resulting in an inaccuracy of an associated model regarding a loss (e.g., time consumption) for processing a search keyword.

Accordingly, with a soft cascade-based training strategy applied on the online hard cascade, a theoretical processing cost, Loss (such as time consumption) is inconsistent with an actual processing cost, Loss (such as time consumption), resulting in an inaccuracy of a model total cost (a total cost such as time consumption, memory and other resources).

Furthermore, a same number of filters are set for all types of service object data in a cascade model, and the qualities of the service object data are different, which may result in a decrease in the search accuracy and a waste of computing resources.

For example, if search keywords are a dress and a mechanical keyboard, the dress is assumed to have 100,000 pieces of related commodity data, and the mechanical keyboard is assumed to have 10,000 pieces of related product data. A cascade model selects 8,000 pieces of commodity data at a first screening, and selects 800 pieces of commodity data at a second screening. This set of parameters may be reasonable for the "dress". However, for the mechanical keyboard, there are only 10,000 pieces of commodity data, and many of which may be of low quality such as low sales volume, and poor service data, etc.

In order to ensure that the theoretical processing cost (such as time consumption) is consistent with the actual processing cost (such as time consumption), ensure that the total model cost (e.g., a total resource cost such as time consumption, memory, etc.) is accurate, and dynamically adjust a screening quantity of each screening layer to achieve the goal of returning not too few results when the number of search results is small and returning not too many results when the number of search results is large, the embodiments of the present disclosure provide the following examples.

Figure 3:
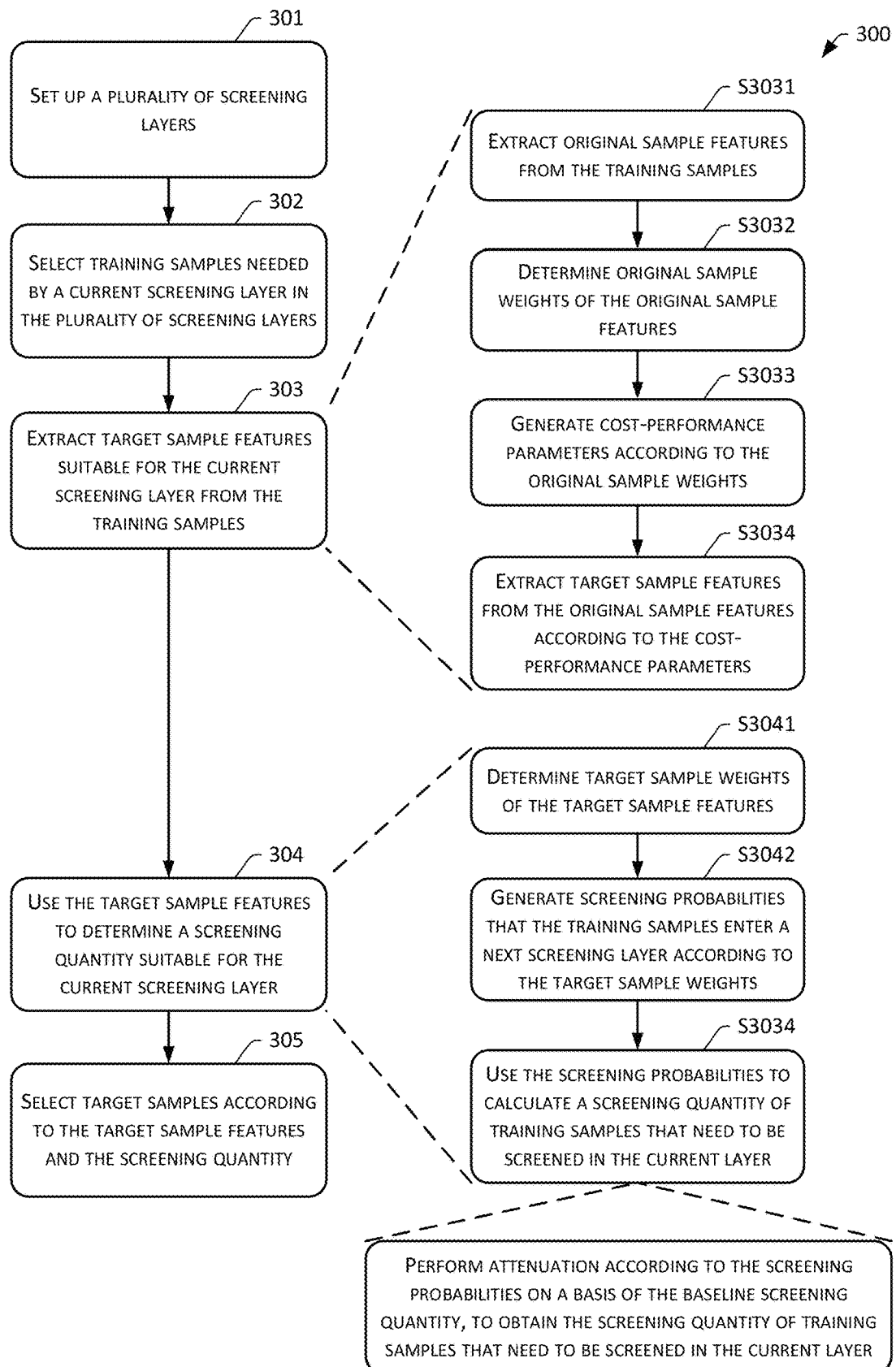
FIG. 3 is a flowchart of a first embodiment of a sample screening method of the present disclosure.

Referring to FIG. 3, a flowchart of a sample screening method 300 according to a first embodiment of the present disclosure is shown, which may specifically include the following operations:

Operation 301: Set up a plurality of screening layers.

In the embodiments of the present disclosure, a cascade model may be used for training, for example, a soft cascade, a hard cascade, and the like. A concept of a screening layer is derived from the cascade model, and the cascade model has a plurality of screening layers, i.e., two or more screening layers. For example, if a cascade model is used for performing a rough screening and a fine screening of training samples, then the rough screening can be set as the first screening layer, and the fine screening can be set as the second screening layer. The number of layers of screening layers can be set by one skilled in the art according to actual conditions, which is not limited in the embodiments of the present disclosure.

The so-called screening layer is an abstract level of sorting logic. Training samples are screened at each screening layer, and selected training samples enter a next screening layer from a current screening layer. Training samples that fail to pass the screening are discarded.

Operation 302: Select training samples needed by a current screening layer in the plurality of screening layers.

Training samples can be different types of data in different application scenarios. In a exemplary embodiment of the present disclosure, the training samples may be service object data. The current screening layer refers to a screening layer at a current layer of operation in the plurality of screening layers. If a cascade model is used for performing rough screening and fine screening of training samples, the first screening layer may be used as the current screening layer during the stage of rough screening, and the second screening layer may be used as the current screening layer during the stage of fine screening.

The embodiments of the present disclosure can be applied to a network platform, and an essence thereof can be an independent server or server cluster, such as a distributed system, which stores a large number of service object data in different fields. For different service areas, different service object data, that is, data with service domain features, may exist.

For example, for the news media field, service object data may be news data. For the mobile communication field, service object data may be mobile communication data. For the electronic commerce (EC) field, service object data may be commodity data, etc.

Although service object data bears different service features, an essence thereof is still data, for example, text, image data, audio data, video data, etc. Therefore, processing of service object data is data processing.

In implementations, a large amount of service object data is stored in a service object database of a system or platform, and a certain amount of service object data matching a certain search keyword (query) may be sampled as training samples for screening according to an actual need. Specifically, these training samples can be positive and negative samples of a certain ratio (e.g., 1:20). For example, in an area of e-commerce, data of commodities of which transactions are completed can be collected as positive samples, and data of commodities of which transactions are unconcluded can be collected as negative samples.

In implementations, the number of training samples needed by an upper screening layer is usually more than the number of training samples needed by a lower screening layer according to characteristics of a cascade model from rough screening to fine screening. In other words, the number of training samples needed by a current screening layer is usually more than the number of training samples needed by a next screening layer. For example, in an application of an e-commerce platform, X pieces of commodity data is assumed to exist in a commodity data pool, that is, training samples needed by a first screening layer is the X pieces of commodity data. M pieces of commodity data having a relatively good quality are then selected from the commodity data pool. In other words, training samples needed by a second screening layer are these M pieces of commodity data having a relatively good quality, where X is greater than M.

Operation 303: Extract target sample features suitable for the current screening layer from the training samples.

The purpose of this operation is to extract the most cost-effective sample features that are suitable for the current screening layer from the training samples.

In various screening layer of the cascade model, the training samples can be sorted.

In general, a level of a screening layer is positively correlated with the number of samples sorted in that screening layer, that is, as the level of the screening layer increases, the number of samples sorted in that screening layer increases accordingly. In implementations, target sample features suitable for a current screening layer may include target sample features suitable for an upper screening layer.

In implementations, operation 303 may include the following sub-operations.

Sub-operation S3031: Extract original sample features from the training samples.

In a specific implementation, original sample features that can be used for ranking can be extracted from the training samples as an example of a specific application of the embodiments of the present disclosure. The original sample features may include commodity quality parameters and after-sales service evaluation parameters of commodity data, conversion rate, cheating score parameters, etc.

Sub-operation S3032: Determine original sample weights of the original sample features.

For these original sample features, a first optimization target parameter may be set. For example, in an electronic commerce field, a sales volume may be set as a first optimization target parameter for commodity data. In other words, as an example of a specific application of the embodiments of the present disclosure, original sample weights may be important degree factors of the original sample features with respect to a preset first optimization target parameter. Specifically, the first optimization target parameter may be used as an optimization goal in practice, and degrees of importance of the original sample features with respect to the first optimization target parameter are calculated by means of Logistic Regression, etc., which are taken as weights of the original sample features.

Sub-operation S3033: Generate cost-performance parameters according to the original sample weights.

In implementations, a cost-performance parameter may be specifically generated as follows:

presetting cost coefficients for processing the original sample features; and calculating ratios between the original sample weights and the cost coefficients as cost-performance parameters.

In practice, the cost coefficients for processing the original sample features may include time consumption, memory application rate, CPU occupancy, and the like. Specifically, ratios between the original sample weights and the cost coefficients represent respective cost performances of the original sample features.

Sub-operation S3034: Extract target sample features from the original sample features according to the cost-performance parameters.

Under normal circumstances, K original sample features with the highest cost-performance parameters can be selected as target sample features, where K is a positive integer. The target sample features in the current screening layer of the cascade model typically contain the target sample features in the previous screening layer. For example, target sample features of a first screening layer are commodity quality and after-sales services, and target sample features of a second screening layer may be commodity quality, after-sales services, conversion rate, whether it is a fraud, and so on.

Apparently, the foregoing method for determining target sample features is only used as an example. When the embodiments of the present disclosure are implemented, other methods for determining target sample features may be set according to actual conditions, which are not limited in the embodiment of the present disclosure. In addition, other than the method for determining target sample features as described above, one skilled in the art can also use other methods for determining target sample features according to actual needs, which are not limited in the embodiments of the present disclosure.

Operation 304: Use the target sample features to determine a screening quantity suitable for the current screening layer.

One of the innovative points of the embodiments of the present disclosure is to adaptively adjust a screening quantity (ranksize) of each screening layer. Service object data is used as an example. If a relatively large quantity of service object data with relatively good quality exists under a search keyword, a screening quantity (ranksize) will be dynamically increased. In the contrary, if a relatively small quantity of service object data with relatively good quality exists under a search keyword, a screening quantity (ranksize) will be dynamically decreased. As such, resources are maximally optimized, thus balancing effects and performance.

In general, a level of a screening layer is inversely related to the number of training samples entering the screening layer. Specifically, as the level of the screening layer increases, the number of training samples entering the screening layer decreases accordingly. In order words, a screening quantity suitable for a current screening layer is generally greater than a screening quantity for a next screening layer.

In implementations, operation 304 may include the following sub-operations:

Sub-operation S3041: Determine target sample weights of the target sample features.

Applying to the embodiments of the present disclosure, the target sample weights may be important degree factors of the target sample features with respect to a preset second optimization target parameter. In a specific implementation, for the target sample features, a second optimization target parameter may be set, and the second optimization target parameter may be used as an optimization goal. Degrees of importance of the target sample features are calculated with respect to the second optimization target parameter as target sample weights by a gradient descent, a Newton method, or the like.

In implementations, the second optimization target parameter may include one or more of the following: an accuracy rate for screening training samples, a total cost coefficient used for processing training samples entering a current screening layer, a number of training samples entering a final screening layer.

In order to ensure a dynamic adjustment of a screening quantity to meet the following requirements of a search engine:

(1) Each search provides enough results to a user for the user to choose;

(2) A cost (such as time consumption, etc.) of each search cannot exceed an upper limit of the search engine, or a problem of having no result in the current search is resulted due to an occurrence of a timeout in calculation of the search engine; and (3) Not too few results are returned when the number of search results is small, and not too many results are returned when the number of search results is large.

In implementations, two limitations (a total cost coefficient for processing training samples entering a current screening layer, and a number of training samples entering a final screening layer) may be added for the second optimization target parameter. Details can be expressed by the following formula:

$$J(w) = -l(w) + \alpha \|w\|_1 + \beta T(w) + \theta_1 C(w) + \theta_2 L(w)$$

where w is a target sample weight, J(w) is a second optimization target parameter, $-l(w)$ represents an accuracy rate of a cascade model, and $\|w\|_1$ is a first-order regular expression that prevents the cascade model from overfitting, T(w) represents a total cost of CPU, C(w) is a function that limits the number of training samples entering a final screening layer, and L(w) is a function that limits a total cost coefficient used for processing the training samples entering a screening layer. $\alpha$, $\beta$, $\theta_1$, and $\theta_2$ are constants.

Service object data is used as an example. If an expectation of service object data entering a final screening layer under a $q^{th}$ search keyword is less than A (A is a lower limit value of service object data to be displayed), C(w)>0, in opposite to the second optimization goal parameter, i.e., minimizing J(w). Conversely, if the expectation of the service object data entering the final level screening layer under the $q^{th}$ search keyword is greater than or equal to A, then C(w)≤0, same as the second optimization goal parameter, i.e., minimizing J(w).

In one example, C(w) and L(w) may be expressed in the following approximation of derivatives:

$$C(w) = \sum_{q=1}^{Q} \delta \log\left(1 + e^{\frac{A - m_q \frac{\sum_{i=1}^{N_q} p_i}{N_q}}{\delta}}\right)$$

$$L(w) = \sum_{q=1}^{Q} \delta \log\left(1 + e^{\frac{\frac{m_q}{N_q} \sum_{i=1}^{N_q}\left[t_1 + \sum_{j=2}^{k} t_j \prod_{l=1}^{j-1} \sigma(f_{c_j}(x_i))\right] - B}{\delta}}\right)$$

C(w) and L(w) employ $$\delta \log\left(1 + e^{\frac{x}{\delta}}\right),$$

with x being $$L(w), \frac{m_q}{N_q} \sum_{i=1}^{N_q}\left[t_1 + \sum_{j=2}^{k} t_j \prod_{l=1}^{j-1} \sigma(f_{c_j}(x_i))\right]$$

in this formula, and are represented by approximation of derivatives of x≤0, y=0, or x>0, y=x when δ tends to 0.

In C(w), q represents a $q^{th}$ search keyword, Q represents an upper limit for the number of search keywords, $m_q$ represents the total number of service object data under the $q^{th}$ search keyword, and $N_q$ represents the number of service object data under the $q^{th}$ search keyword, $p_i$ represents a screening probability of an $i^{th}$ service object data entering into a final screening layer, and $$m_q \frac{\sum_{i=1}^{N_q} p_i}{N_q}$$

represents the number of service object data under the $q^{th}$ search keyword that enters into the final screening layer.

In this expression, since multiple types of service object data under a qth search keyword may exist, and each type of service object data has a corresponding $p_i$, the $p_i$ of various types of service object data may be averaged, and $m_q$ and an average value of $p_i$ may be multiplied, so as to obtain the number of training samples entering the final screening layer.

Therefore, during a screening process of training samples, if an expectation of service object data entering a final screening layer under a $q^{th}$ search keyword is less than A (A is a lower limit value of service object data to be displayed), C(w)>0, in opposite to the second optimization goal parameter, i.e., minimizing J(w). Conversely, if the expectation of the service object data entering the final level screening layer under the $q^{th}$ search keyword is greater than or equal to A, then C(w)≤0, same as the second optimization goal parameter, i.e., minimizing J(w).

For $$A - m_q \frac{\sum_{i=1}^{N_q} p_i}{N_q}, \frac{m_q}{N_q} \sum_{i=1}^{N_q}\left[t_1 + \sum_{j=2}^{k} t_j \prod_{l=1}^{j-1} \sigma(f_{c_j}(x_i))\right] - B$$

represents a total cost coefficient under a $q^{th}$ search keyword (e.g., total elapsed time), and t denotes a cost coefficient (e.g., time consumed) used for processing service object data (e.g., computing a score (feature)) in a screening layer. In this expression, a cost coefficient of processing each service object data at each screening layer may be statistically calculated offline, and cost coefficients in the screening layers may be accumulated, so that a total cost coefficient of processing training samples that enter into a screening layer may be obtained.

In the screening process of training samples, a total cost coefficient under a target $q^{th}$ search keyword is less than B (B is an upper limit value of a total cost), if the total cost coefficient under the $q^{th}$ search keyword is greater than B, then L(w)>0, which is opposite to the second optimization objective parameter, i.e., minimizing J(w). Conversely, if the total cost coefficient under the $q^{th}$ search keyword is less than or equal to B, then L(w)≤0, which is the same as the second optimization goal parameter, i.e., minimizing J(w).

For example, A (a lower limit value of service object data to be displayed) is assumed to be 200, and B (an upper limit value of the total cost) is assumed to be 130.

Gmv (total transaction volume) is 0.16%, and a latency (a delay used by a search engine to calculate features) is 30%.

A limit AUC (Area under Curve, an area under a Roc curve) of a search keyword is assumed to be 0.80. If limitations due to C(w) and L(w) are not added, a situation of screening is as shown in Table 1:

TABLE 1

| Query | Mass selection quantity | Fine selection quantity | Time consumed for calculation |
|---|---|---|---|
| Female summer short | 93742 | 6308.2 | 183.34 |
| Wine | 65196 | 2955.77 | 117.872 |
| Chandelier | 34096 | 1907.56 | 66.5434 |
| Badminton Racket | 6306 | 556.776 | 13.2002 |
| Cuprammouium dress | 715 | 50.0786 | 1.54921 |

As can be seen from Table 1, when the number of search results (i.e., commodity data) is small, the number of fine screening is also reduced, and the time required for a high-frequency search keyword (query) exceeds an upper limit of a search engine.

Limitations due to C(w) and L(w) are added, while keeping AUC=0.80, a screening situation is as shown in Table 2:

TABLE 2

| Query | Mass selection quantity | Fine selection quantity | Time consumed for calculation |
|---|---|---|---|
| Female summer short | 93742 | 3625.42 | 129.81 |
| Wine | 65196 | 1387.81 | 95.746 |
| Chandelier | 34096 | 1617.25 | 65.5549 |
| Badminton Racket | 6306 | 705.523 | 15.2523 |
| Cuprammouium dress | 715 | 315.569 | 4.57592 |

As can be seen from Table 1, when the number of search results (i.e., commodity data) is few, the number of fine screening will increase, and the time required for a high-frequency search keyword (query) does not exceed an upper limit of a search engine.

As can be seen, with an addition of C(w) and L(w), the screening process of training samples optimizes a balance among an accuracy of screening training samples, a total cost coefficient for processing training samples entering a current screening layer, and a number of training samples entering a final screening layer, which is equivalent to optimizing search effects and performance, while achieving a goal of returning not too few results when the number of search results is small and returning not too many results when the number of search results is large.

Sub-operation S3042: Generate screening probabilities that the training samples enter a next screening layer according to the target sample weights.

In implementations, inner products of target sample weights and target sample features of a current screening layer may be calculated as screening probabilities that training samples pass through the current screening layer into a next screening layer. Specifically, the inner products of the target sample weights for the target sample features of the current screening layer may be mapped to between 0-1 as the screening probabilities that the training samples pass through the current screening layer into the next screening layer.

For example, the following formula can be used to calculate a screening probability that a training sample passes through a current screening layer into a next screening layer:

$$p_i = p(y=1 \mid x, w) = \prod_{j=1}^{K} p_{c_j}(y=1 \mid x, w) = \prod_{j=1}^{K} \sigma(f_{c_j}(x))$$

where $$\sigma(z) = \frac{1}{1+e^{-z}}$$

$$f_{c_j}(x) = \sum_{k=1}^{j} w_{jk}^T x^k$$

where k represents a level of a screening layer in a cascade model, $c_j$ represents a $j^{th}$ screening layer, $w_{jk}$ represents a weight of a $k^{th}$ feature in the $j^{th}$ screening layer, x represents a training sample, and w represents a feature of the screening layer, $t_i$ represents a cost coefficient for calculating a score (feature) for each screening layer, $y_i$ denotes a classification of an $i^{th}$ training sample, and $p_i$ denotes a screening probability that the $i^{th}$ training sample is predicted as a positive sample.

Sub-operation S3043: Use the screening probabilities to calculate a screening quantity of training samples that need to be screened in the current layer.

In implementations, sub-operation S3043 may further include the following sub-operations:

Sub-operation S431: Perform attenuation according to the screening probabilities on a basis of the baseline screening quantity, to obtain the screening quantity of training samples that need to be screened in the current layer.

Service object data is taken as an example. By acquiring a screening quantity (ranksize) of the service object data passing through an upper screening layer into the current screening layer as a baseline screening quantity, a screening quantity of the service object data that passes through the current screening layer into a lower screening layer is obtained by performing attenuation according to screening probabilities on a basis of the baseline screening quantity.

For example, a respective screening quantity of each screening layer can be calculated by the following formula:

$$M = X \frac{\sum_{i=1}^{|instance|} p_{i_1}}{|instance|}$$

$$N = M \frac{\sum_{i=1}^{|instance|} p_{i_2}}{|instance|}$$

where instance is the number of training samples, X is the number of all training samples that enter a cascade model, M is a screening quantity of a first screening layer, N is a screening quantity of a second screening layer, and so on.

Compared with existing solutions, the embodiments of the present disclosure satisfy a way of calculating a total cost by calculating a screening quantity of training samples that pass through a current screening layer to enter a next screening layer, so that a theoretical processing cost (such as time consumed) and an actual processing cost (such as time consumed) are consistent, thus ensuring that a total model cost (such as a sum of resource costs such as time consumed, memory, etc.) is accurate.

Operation 305: Select target samples according to the target sample features and the screening quantity.

In a scenario of rough screening and fine screening of an e-commerce platform, X pieces of commodity data are assumed to exist in a commodity data pool. First, M pieces of commodity data having a relatively good quality (i.e., target samples of a first screening layer) are selected from the commodity data pool based on target sample features of the first screening layer and according to a screening quantity of the first screening layer. N pieces of commodity data that are determined to be pushed to a user (i.e., target samples of the second screening layer are also final target samples of the current two-stage screening layer model) are selected from the M pieces of commodity data based on target sample features of a second screening layer and according to a screening quantity of the second screening layer. Furthermore, X-M pieces of commodity data are determined not to be pushed to the user.

Based on the above examples, it can be understood that, in the embodiments of the present disclosure, if a current screening layer is not a final layer of a plurality of screening layers in a current model, a "target sample" in this operation is a target sample suitable for the current screening layer, i.e., a target sample of an intermediate layer, which also acts on a training sample that is put into a next screening layer. If the current screening layer is the final layer of the plurality of screening layers in the current model, the "target sample" in this operation is a final target sample of the current model. Regarding how target samples are used at a subsequent stage, one skilled in the art can make settings at will according to actual conditions, which is not limited by the present disclosure.

In practice, it needs to be further noted that whether target samples of an intermediate layer are completely used as training samples for a next screening layer, or only a part thereof are used as the training samples for the next screening layer, are both practically feasible. The present disclosure does not have any limitation thereon.

In implementations, a relationship between the search keyword and the screening quantity can be further established.

In this case, a correlation between a respective screening quantity of each screening layer in a cascade model that is trained and corresponding search keyword(s) can be established, and stored in a database for future uses in offline scenarios.

In order to make one skilled in the art to understand the embodiments of the present disclosure in a better manner, commodity data is used as an example of service object data hereinafter for illustration.

Figure 4:
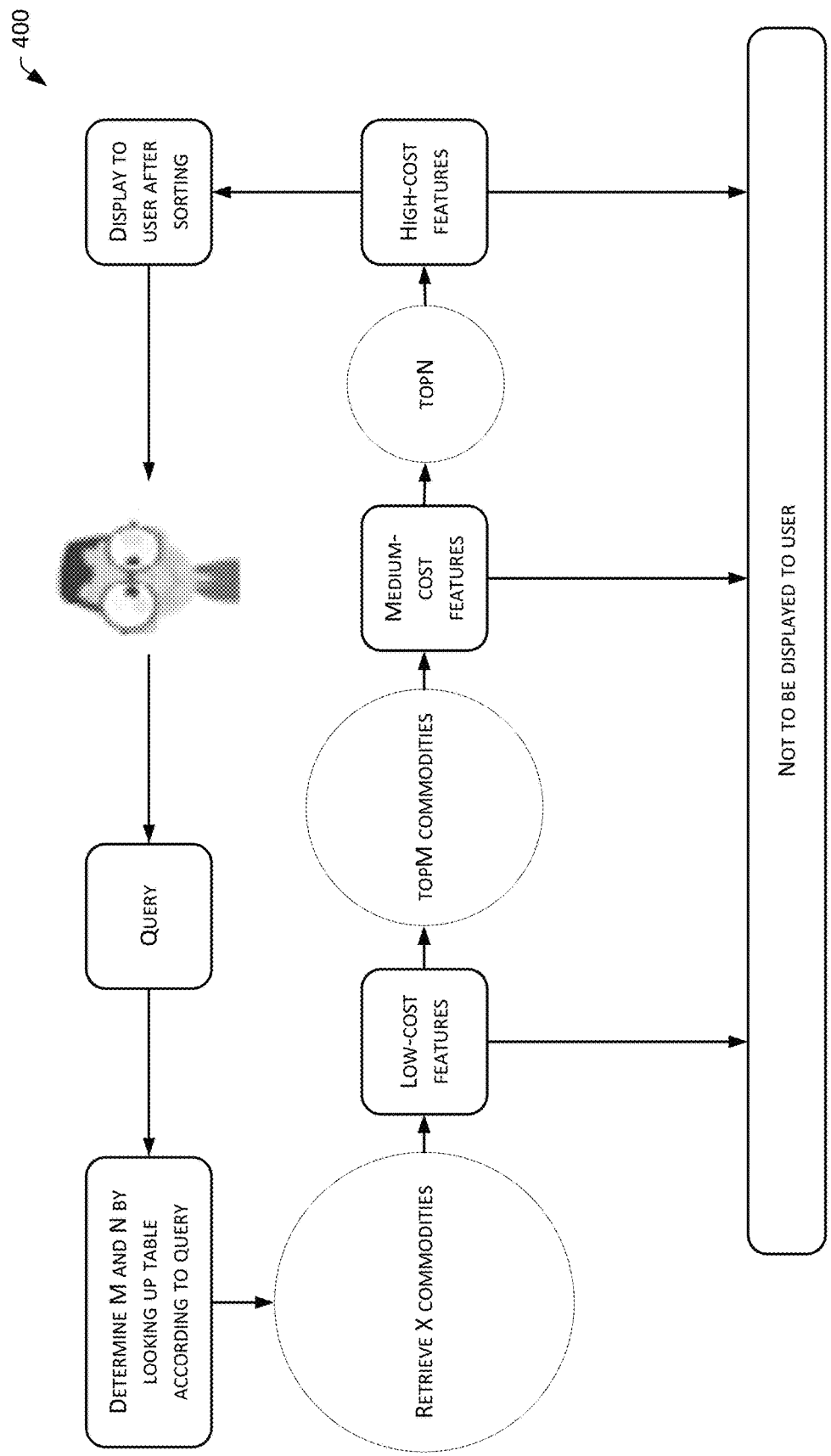
FIG. 4 is a flowchart of an example of commodity data screening in accordance with an embodiment of the present disclosure.

FIG. 4 is an example of commodity data screening 400 in accordance with an embodiment of the present disclosure. As shown in FIG. 4, in this example, a user can input a search keyword (Query) in a search box of a shopping website. After a search engine receives the search keyword, the search engine can obtain a screening quantity M suitable for a first screening layer (rough screening), and a screening quantity N suitable for a second screening layer (fine screening) through correlations between screening numbers and search keywords that are pre-stored in the database.

X pieces of commodity data that match the search keyword (Query) are retrieved from a commodity pool, and inputted into a cascade model. The cascade model has a total of three screening layers:

In a first screening layer, three features of commodity data are extracted as low-cost features (target sample features of the first screening layer). Scores (feature) are calculated, and sorting is then performed. From sorted commodity data, first M (topM) pieces of the commodity data (target samples of the first screening layer) are selected into a second screening layer according to a screening quantity M suitable for the first screening layer, and remaining ones are not pushed to a user.

In the second screening layer, five features of the commodity data are extracted as cost features (target sample features of the second screening layer). Scores (feature) are calculated, and sorting is then performed. From sorted commodity data, first N (topN) pieces of the commodity data (target samples of the second screening layer) are selected into a third screening layer according to a screening quantity N suitable for the second screening layer, and remaining ones are not pushed to a user.

In the third screening layer, ten features of the commodity data (target sample features of the third screening layer) are extracted as high-cost features. Scores (feature) are calculated, and sorting is then performed. Sorted commodity data (target samples of the third screening layer) is then pushed to the user on a web page of a shopping website.

In this example, the target sample features of the second screening layer may include the target sample features of the first screening layer, and the target sample features of the third screening layer may include the target sample features of the second screening layer.

A cascade model used in the embodiments of the present disclosure has a plurality of screening layers. When training samples are screened at each screening layer, a screening quantity at each screening layer can be dynamically adjusted according to target sample features of the training samples, thus screening out a suitable number of target samples having a relatively high quality, which can save computing resources while ensuring high search accuracy.

The embodiments of the present disclosure calculate a screening quantity of each screening layers for dynamic adjustment based on factors such as an accuracy of screening training samples, a total cost coefficient for processing training samples entering a current screening layer, the number of training samples entering a final screening layer, etc. This can optimize effects and performance of sample screening, and at the same time achieve a goal of returning not too few results when the number of search results is small, and returning not too many results when the number of search results is large.

The embodiments of the present disclosure satisfy a way of calculating a total cost by calculating a screening quantity of training samples that pass through a current screening layer to enter a next screening layer using screening probabilities of entering the next screening layer from the current screening layer, so that a theoretical processing cost (such as time consumed) and an actual processing cost (such as time consumed) are consistent, thus ensuring that a total model cost (such as a sum of resource costs such as time consumed, memory, etc.) is accurate.

Figure 5:
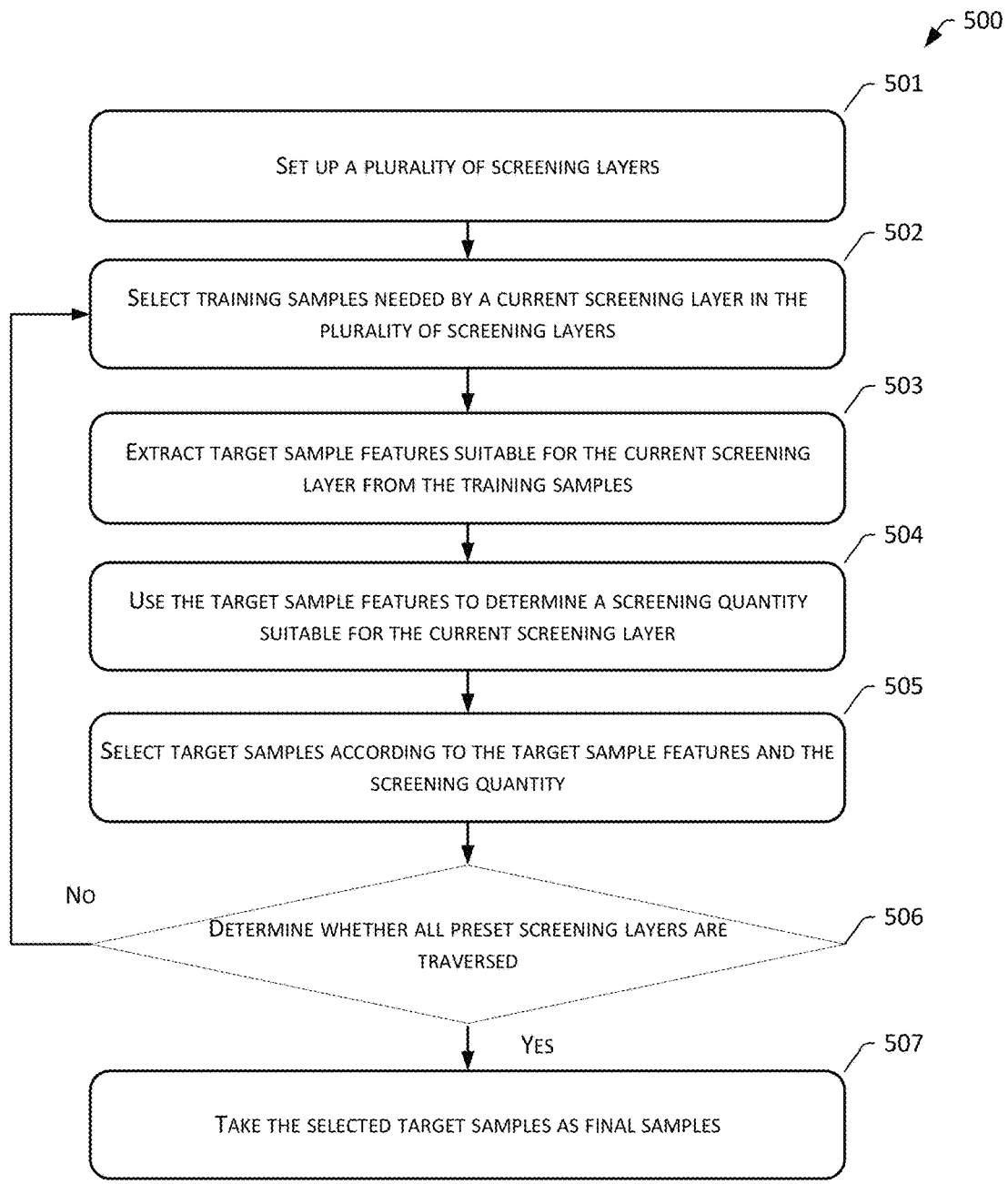
FIG. 5 is a flowchart of a second embodiment of a sample screening method of the present disclosure.

Referring to FIG. 5, a flowchart of a sample screening method 500 according to a second embodiment of the present disclosure is shown, which may specifically include the following operations:

Operation 501: Set up a plurality of screening layers.

Operation 502: Select training samples needed by a current screening layer in the plurality of screening layers.

Operation 503: Extract target sample features suitable for the current screening layer from the training samples.

Operation 504: Use the target sample features to determine a screening quantity suitable for the current screening layer.

Operation 505: Select target samples according to the target sample features and the screening quantity.

Operation 506: Determine whether all preset screening layers are traversed, perform operation 507 if affirmative, and return to operation 502 if not.

Operation 507: Take the selected target samples as final samples.

In implementations, the number of training samples needed by a current screening layer is more than the number of training samples needed by a next screening layer. Target sample features suitable for the current screening layer contains training sample features suitable for a previous screening layer. A screening quantity suitable for the current screening layer is greater than a screening quantity of the next screening layer.

As an example of a specific application of the embodiments of the present disclosure, the following operation may also be included: pushing the final samples to a user.

The present embodiment is further illustrated using an example.

A current cascade model is assumed to have a total of 3 screening layers.

S1: Determine that training samples needed by a first screening layer are X pieces of commodity data that match with a search keyword (Query).

S2: Extract three low-cost features as target sample features suitable for the first screening layer from the X pieces of commodity data.

S3: Use these three low-cost features to determine a screening quantity M for the first screening layer.

S4: Separately calculate scores corresponding to the three low-cost features for the X pieces of commodity data, sort X pieces of commodity data by the scores, and select first M (topM) pieces of commodity data from the sorted commodity data (target samples of the first screening layer) to enter a second screening layer, whereas the rest (X-M pieces of commodity data) is not pushed to a user.

S5: Determine that training samples needed by the second screening layer is the M pieces of commodity data screened and selected through the first screening layer.

S6: Extract five medium-cost features as target sample features suitable for the second screening layer from the M pieces of commodity data.

The five medium-cost features may include the above three low-cost features. Apparently, under special circumstances, these five medium-cost features may not include the above three low-cost features. One skilled in the art may have arbitrary settings according to actual conditions. The embodiments of the present disclosure do not have any limitation thereon.

S7: Use the five medium-cost features to determine a screening quantity N suitable for the second screening layer.

S8: Separately calculate scores corresponding to the five medium-cost features for the M pieces of commodity data, sort M pieces of commodity data by the scores, and select first N (topN) pieces of commodity data from the sorted commodity data (target samples of the second screening layer) to enter a third screening layer, whereas the rest (M-N pieces of commodity data) is not pushed to the user.

S9: Determine that training samples needed by the third screening layer is the N pieces of commodity data that are screened and selected by the second screening layer.

S10: Extract ten high-cost features from the N pieces of commodity data as target sample features suitable for the third screening layer.

The ten high-cost features may include the above five medium-cost features. Apparently, under special circumstances, the ten high-cost features may not include the above five medium-cost features. One skilled in the art may have arbitrary settings according to actual conditions. The embodiments of the present disclosure do not have any limitation thereon.

S11: Use the ten high-cost features to determine a screening quantity O suitable for the third screening layer.

S12: Separately calculate scores corresponding to the ten high-cost features for the N pieces of commodity data, sort the N pieces of commodity data by the scores, and select first O (topO) pieces of commodity data from the sorted commodity data (target samples of third screening layer) to be pushed to the user.

In implementations, according to actual conditions, the sorted N pieces of commodity data in the final screening layer can be directly pushed to the user, without further selection of the first O pieces of commodity data for pushing. One skilled in the art may have arbitrary settings according to actual conditions. The embodiments of the present disclosure do not have any limitation thereon.

Figure 6:
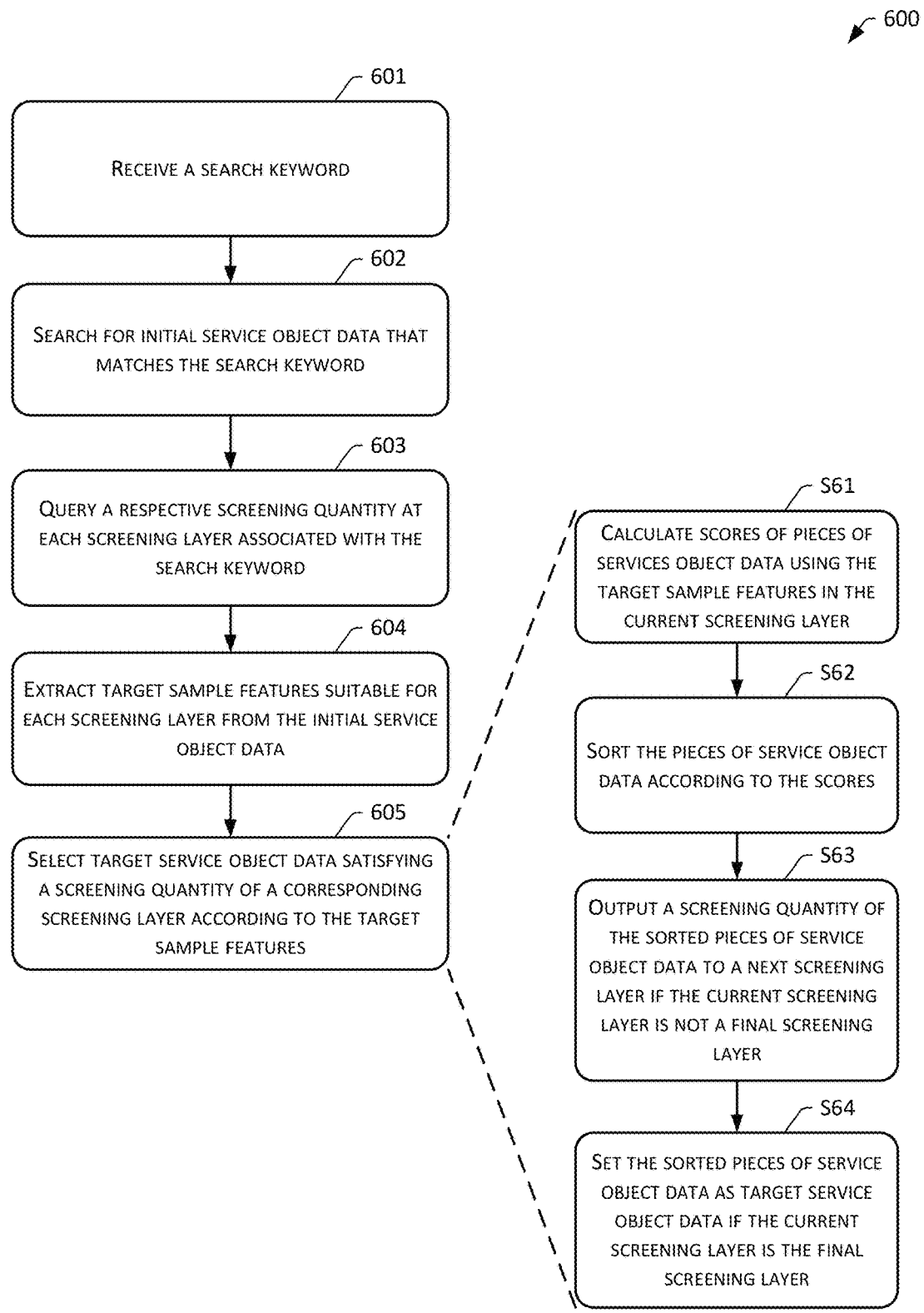
FIG. 6 is a flowchart of a method of searching for service object data in accordance with an embodiment of the present disclosure.

FIG. 6 shows a flowchart of a method 600 of searching for service object data according to an embodiment of the present disclosure. The present embodiment relates to a process of searching for service object data in a plurality of screening layers, which may specifically include the following operations.

Operation 601: Receive a search keyword.

In implementations, a user may send a search request to a network platform through a browser, a shopping application, or other client. The search request includes a search keyword which may be used to request the network platform to search for service object data matching therewith.

Operation 602: Search for initial service object data that matches the search keyword.

If receiving the search request sent by the client, the network platform may extract the search keyword from the search request, and search for pieces of service object data matching therewith through an inverted index, etc. These pieces of services object data are the initial service object data that are referred to in the present embodiment.

Operation 603: Query a respective screening quantity at each screening layer associated with the search keyword.

In implementations, a respective screening quantity associated with the search keyword that is pre-trained and used for screening service object data at each screening layer may be looked up from a database.

In implementations, the screening quantity can be trained as follows:

Sub-operation S31: Calculate target sample weights of target sample features based on a preset optimization target parameter, the target sample features being extracted from target samples.

Sub-operation S32: Calculate inner products of the target sample weights for the target sample features of a current screening layer as screening probabilities that the training samples are screened and selected into a next screening layer through the current screening layer.

Sub-operation S33: Calculate a screening quantity of the training samples that screened through the current screening layer to enter the next screening layer using the screening probabilities.

The preset optimization target parameter includes one or more of the following: an accuracy of screening service object data, a total cost coefficient for processing training samples that enter a screening layer, and a number of training samples entering a final screening layer.

In implementations, since sub-operations S31-S33 are basically similar to the application of the embodiment of the sample screening method, the description thereof is relatively simple. For a related part, reference may be made to a part of the description of the embodiment of the sample screening method. Details thereof are not described herein in the embodiments of the present disclosure.

Operation 604: Extract target sample features suitable for each screening layer from the initial service object data.

In implementations, feature type(s) used for calculating sorting positions in each screening layer may be determined, and target sample features may be extracted from the service object data according to the feature type in each screening layer.

Operation 605: Select target service object data satisfying a screening quantity of a corresponding screening layer according to the target sample features.

After relevant screening quantities are found, sorting can be performed at each level screening layer, and screening and selection can be made according to a respective screening quantity.

In implementations, operation 605 may include the following sub-operations.

Sub-operation S61: Calculate scores of pieces of services object data using the target sample features in the current screening layer.

In implementations, weights of the target sample features can be calculated for specific optimization target parameters (such as a click rate, a transaction volume, a sales volume, etc.). After the weights are given to corresponding target sample features, scores of pieces of the service object data are calculated using an approach such as a weighted summation, a weighted averaging, etc.

It should be noted that the scores (feature) calculated for each screening layer are passed directly from a previous screening layer to a subsequent screening layer in order to avoid double counting.

Sub-operation S62: Sort the pieces of service object data according to the scores.

Sub-operation S63: Output a screening quantity of the sorted pieces of service object data to a next screening layer if the current screening layer is not a final screening layer.

Sub-operation S64: Set the sorted pieces of service object data as target service object data if the current screening layer is the final screening layer.

If the pieces of service object data are sorted in order according to the scores, and if the screening number is assumed to be Z, the highest Z ranked pieces of service object data can be extracted and inputted to a next layer for sorting.

If the current screening layer is a final screening layer, the pieces of service object data can be set as pieces of target service object data and returned to a client for display.

Furthermore, since display positions of a client are limited in number, a first part of the sorted target service object data may be returned to the client for display. When a page scrolling operation is triggered, a subsequent part of the sorted target service object data can be returned to the client for continued display.

For example, a user can input a search keyword (Query) in a search box of a shopping website. In response to receiving the search keyword, a search engine determines screening quantities M and N by looking up a table.

X pieces of commodity data that match the search keyword (Query) are retrieved from a commodity pool, and inputted into a cascade model. The cascade model has a total of three screening layers.

In a first screening layer, three features of the commodity data are extracted as low-cost features. Scores (feature) are calculated, and sorting is then performed.

First M (topM) pieces of commodity data are selected from the sorted commodity data, and enter into a second screening layer, while the rest is not pushed to the user.

In the second screening layer, five features of the commodity data are extracted as medium-cost features. Scores (feature) are calculated, and sorting is then performed.

First N (topN) pieces of commodity data are selected from the sorted commodity data, and enter into a third screening layer, while the rest is not pushed to the user.

In the third screening layer, ten features of the commodity data are extracted as high-cost features. Scores (feature) are calculated, and sorting is then performed.

The sorted commodity data is pushed to the user on a web page of the shopping website.

A cascade model in the embodiments of the present disclosure has a plurality of screening layers. Screening of service object data is performed between every two screening layers, and a screening quantity between every two screening layers can be dynamically adjusted according to features of service object data under a search keyword may. As such, a suitable number of high-quality service object data can be selected according to the search keyword, which can save computing resources while ensuring high search accuracy.

The embodiments of the present disclosure calculate a screening quantity between two screening layers for dynamic adjustment based on factors such as an accuracy of screening training samples, a total cost coefficient for processing training samples entering a current screening layer, the number of training samples entering a final screening layer, etc. This can optimize effects and performance of sample screening, and at the same time achieve a goal of returning not too few results when the number of search results is small, and returning not too many results when the number of search results is large.

The embodiments of the present disclosure satisfy a way of calculating a total cost by calculating a screening quantity of training samples that pass through a current screening layer to enter a next screening layer using screening probabilities of entering the next screening layer from the current screening layer, so that a theoretical processing cost (such as time consumed) and an actual processing cost (such as time consumed) are consistent, thus ensuring that a total model cost (such as a sum of resource costs such as time consumed, memory, etc.) is accurate.

Figure 7:
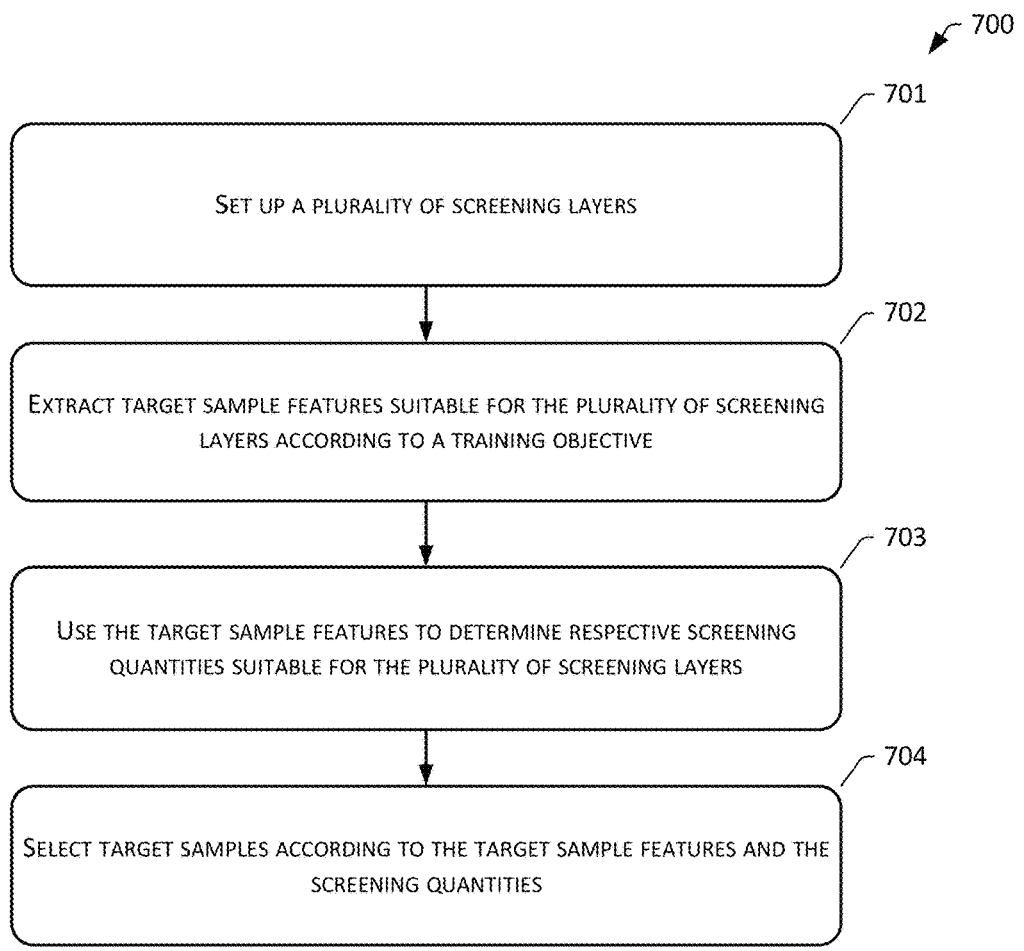
FIG. 7 is a flowchart of a third embodiment of a sample screening method of the present disclosure.

Referring to FIG. 7, a flowchart of a sample screening method according to a third embodiment of the present disclosure is shown, which may specifically include the following operations.

Operation 701: Set up a plurality of screening layers.

Operation 702: Extract target sample features suitable for the plurality of screening layers according to a training objective.

Operation 703: Use the target sample features to determine respective screening quantities suitable for the plurality of screening layers.

Operation 704: Select target samples according to the target sample features and the screening quantities.

In practice, one skilled in the art can construct a cascade model using the present embodiment based on development requirements or application scenarios (such as requirements for developing a search engine), or based on a guidance of a total sales volume of commodities, or based on personalized preference setting of user(s), thus screening and selecting final samples that maximally optimize resources, balance effects, and computational performance.

In implementations, the plurality of screening layers includes at least two screening layers, wherein a number of training samples needed by a previous screening layer is more than a number of training samples needed by a next screening layer, target sample features for the next screening layer include target sample features of the previous screening layer, and a screening quantity of the previous screening layer is greater than a screening quantity of the next screening layer.

As an example of a specific application of the embodiments of the present disclosure, the training samples may be service object data that matches a search keyword, and the present embodiment may further include the following operation: generating an association relationship between the search keyword and the screening quantity.

A process of searching for service object data is used as an example. The present embodiment may also include the following operations:

receiving a search keyword;

searching for initial service object data that matches the search keyword;

querying a respective screening quantity of each screening layer associated with the search keyword;

extracting target sample features suitable for each screening layer from the initial service object data; and selecting target service object data satisfying a screening quantity of a corresponding screening layer based on the target sample features.

In implementations, selecting the target service object data meeting the screening quantity of the corresponding screening layer based on the target sample features may further include the following sub-operations:

calculating respective scores of the initial service object data using the target sample features in a current screening layer;

sorting the initial service object data according to the scores;

outputting the screening quantity of the sorted service object data to a next screening layer when the current screening layer is not a final screening layer; and setting the screened service object data as target service object data when the current filter layer is the final screening layer.

In implementations, extracting the target sample features suitable for the current screening layer from the training samples may further include the following sub-operations:

extracting original sample features from the training samples;

determining original sample weights of the original sample features;

generating cost-performance parameters based on the original sample weights; and extracting the target sample features from the original sample features according to the cost-performance parameters.

In implementations, the original sample weights are important degree factors of the original sample features with respect to preset first optimization target parameter(s).

Generating the cost-performance parameters according to the original sample weights further includes:

pre-configuring cost coefficients of processing the original sample features; and calculating ratios between the original sample weights and the cost coefficients as the cost-performance parameters.

As an example of a specific application of the embodiments of the present disclosure, the service object data may be commodity data. The original sample features may include commodity quality parameters, after-sales service evaluation parameters, conversion rates, and cheating score parameters of the commodity data. The first optimization target parameter(s) may include commodity data transaction volume. The cost coefficients of processing the original sample features may include time consumption, a memory application rate, and a CPU occupancy rate.

In implementations, determining the screening quantity suitable for the current screening layer using the target sample features may include the following sub-operations:

determining target sample weights of the target sample features;

generating a screening probability that the training samples enter a next screening layer based on the target sample weights; and calculating the screening quantity of training samples to be screened at the current screening layer using the screening probability.

In implementations, the target sample weights are important degree factors of the target sample features with respect to preset second optimization target parameter(s). The second optimization target parameter(s) may include one or more of the following:

an accuracy rate of screening the training samples, a total cost factor used for processing training samples that enter the current screening layer, and a number of training samples that enter the last screening layer.

As an example of a specific application of the embodiments of the present disclosure, generating the screening probability that the training samples enter the next screening layer based on the target sample weights may further include:

calculating an inner product of the target sample weights for the target sample features of the current screening layer; and mapping the inner product into an interval of 0-1 to obtain the screening probability.

Furthermore, calculating the screening quantity of the training samples to be screened at the current screening layer using the screening probability further includes:

determining a baseline screening quantity, the baseline screening quantity being a screening quantity suitable for the previous screening layer; and attenuating the screening probability based on the baseline screening quantity to obtain the screening quantity of the training samples to be screened at the current layer.

In implementations, the embodiments of the present disclosure may further include the following operations:

determining whether all preset screening layers are traversed;

taking selected target samples as final samples if affirmative; and returning to the determining of the training samples needed by the current screening layer if not.

It should be noted that the method embodiments are expressed as series of action combinations for the sake of description. However, one skilled in the art should be aware that the embodiments of the present disclosure are not limited by the described orders of actions because some operations may be performed in other orders or simultaneously according to the embodiments of the present disclosure. Moreover, one skilled in the art should also understand that the embodiments described in the specification all belong to exemplary embodiments, and actions involved therein are not necessarily required by the embodiments of the present disclosure.

Figure 8:
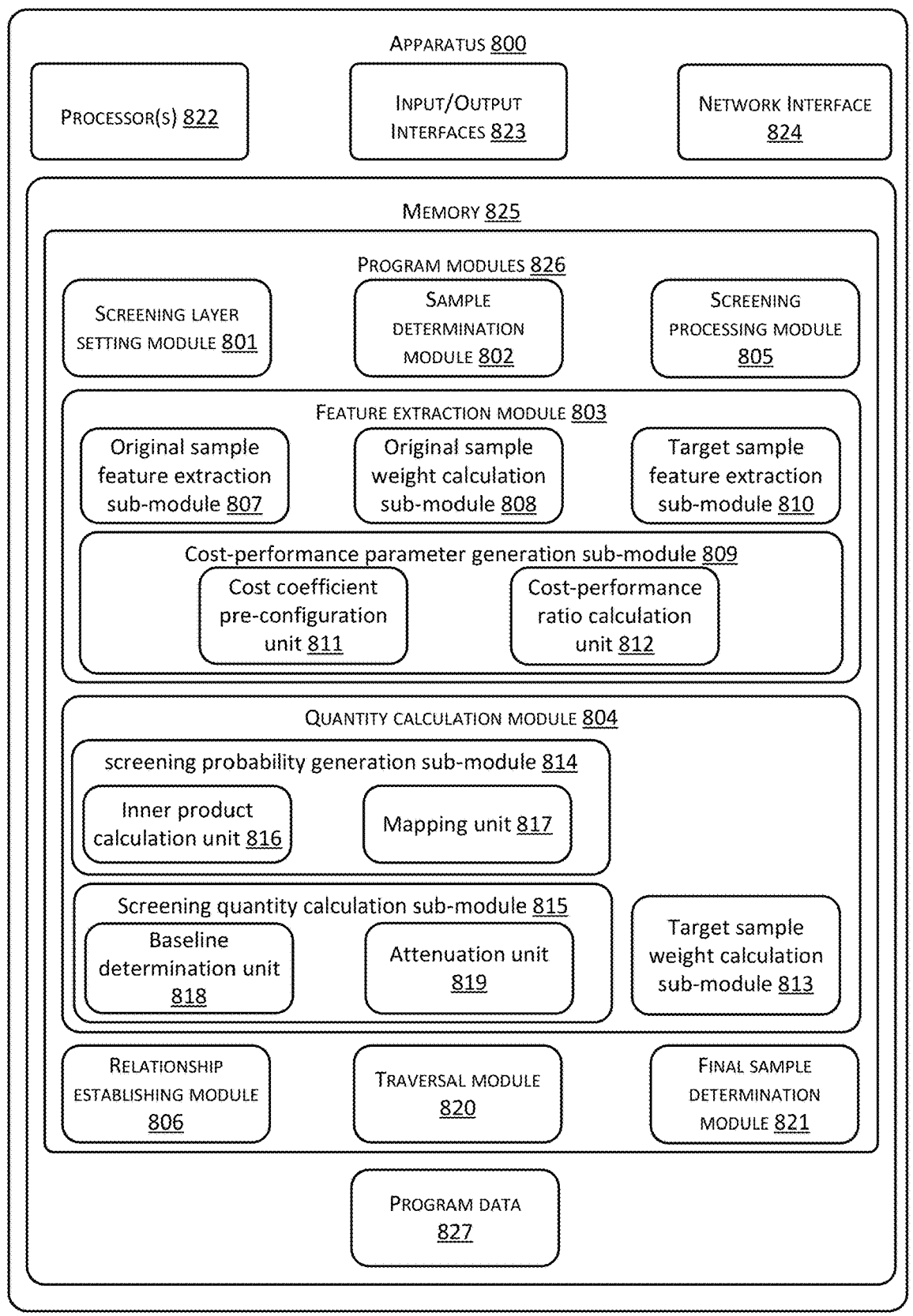
FIG. 8 is a structural diagram of a sample screening apparatus in accordance with an embodiment of the present disclosure.

Referring to FIG. 8, a structural block diagram of a sample screening apparatus 800 in accordance with an embodiment of the present disclosure is shown. In implementations, the apparatus 800 may include one or more computing devices. In implementations, the apparatus 800 may be a part of one or more computing devices, e.g., implemented or run by the one or more computing devices. In implementations, the one or more computing devices may be located in a single place or distributed among a plurality of network devices over a network. By way of example and not limitation, the apparatus 800 may specifically include the following modules.

a screening layer setting module 801 used for setting up a plurality of screening layers;

a sample determination module 802 used for selecting training samples needed by a current screening layer in the plurality of screening layers;

a feature extraction module 803 used for extracting target sample features suitable for the current screening layer from the training samples;

a quantity calculation module 804 used for determining a screening quantity suitable for the current screening layer using the target sample features; and a screening processing module 805 used for screening target samples based on the target sample features and the screening quantity.

In implementations, a number of the training samples needed by the current screening layer may be more than a number of training samples needed by a next screening layer, the target sample features suitable for the current screening layer may include target sample features suitable for a previous screening layer, and the screening quantity suitable for the current screening layer may be greater than a screening quantity for the next screening layer.

In implementations, the training samples may be service object data matched with search keyword(s). In this case, the apparatus may further include the following module:

a relationship establishing module 806 used for generating an association relationship between the search keyword(s) and the screening quantity.

As an example of a specific application of the embodiments of the present disclosure, the feature extraction module 803 may include the following sub-modules:

an original sample feature extraction sub-module 807 used for extracting original sample features from the training samples;

an original sample weight calculation sub-module 808 used for determining original sample weights of the original sample features;

a cost-performance parameter generation sub-module 809 used for generating cost-performance parameters based on the original sample weights; and a target sample feature extraction sub-module 810 used for extracting the target sample features from the original sample features according to the cost-performance parameters.

In implementations, the original sample weights may be important degree factors of the original sample features with respect to preset first optimization target parameter(s).

The cost-performance parameter generation sub-module 809 may further include the following units:

a cost coefficient pre-configuration unit 811 used for pre-configuring cost coefficients of processing the original sample features; and a cost-performance ratio calculation unit 812 used for calculating ratios between the original sample weights and the cost coefficients as the cost-performance parameters.

In a specific implementation, the service object data may be commodity data. The original sample features may include commodity quality parameters, after-sales service evaluation parameters, conversion rates, and cheating score parameters of the commodity data. The first optimization target parameter(s) may include commodity data transaction volume. The cost coefficients of processing the original sample features may include time consumption, a memory application rate, and a CPU occupancy rate.

In implementations, the quantity calculation module 804 may include the following sub-modules:

a target sample weight calculation sub-module 813 used for determining target sample weights of the target sample features;

a screening probability generation sub-module 814 used for generating a screening probability that the training samples enter a next screening layer based on the target sample weights; and a screening quantity calculation sub-module 815 used for calculating the screening quantity of training samples to be screened at the current screening layer using the screening probability.

As an example of a specific application of the embodiments of the present disclosure, the target sample weights may be important degree factors of the target sample features with respect to preset second optimization target parameter(s).

The second optimization target parameter(s) may include one or more of the following:

an accuracy rate of screening the training samples, a total cost factor used for processing training samples that enter the current screening layer, and a number of training samples that enter the last screening layer.

In implementations, the screening probability generation sub-module 814 may further include the following units:

an inner product calculation unit 816 used for calculating an inner product of the target sample weights for the target sample features of the current screening layer; and a mapping unit 817 used for mapping the inner product into an interval of 0-1 to obtain the screening probability.

The screening quantity calculation sub-module 815 may further include the following units:

a baseline determination unit 818 used for determining a baseline screening quantity, the baseline screening quantity being a screening quantity suitable for the previous screening layer; and an attenuation unit 819 used for attenuating the screening probability based on the baseline screening quantity to obtain the screening quantity of the training samples to be screened at the current layer.

In implementations, the apparatus may further include the following modules:

a traversal module 820 used for determining whether all preset screening layers are traversed, calling a final sample determination module 821 if affirmative, and returning to call the sample determination unit 802 if not; and the final sample determination module 821 used for taking selected target samples as final samples.

In implementations, the apparatus 800 may also include one or more processors 822, an input/output (I/O) interface 823, a network interface 824, and memory 825.

The memory 825 may include a form of computer readable media such as a volatile memory, a random access memory (RAM) and/or a non-volatile memory, for example, a read-only memory (ROM) or a flash RAM. The memory 825 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 825 may include program modules 826 and program data 827. The program modules 826 may include one or more of the modules as described above with respect to FIG. 8.

Figure 9:
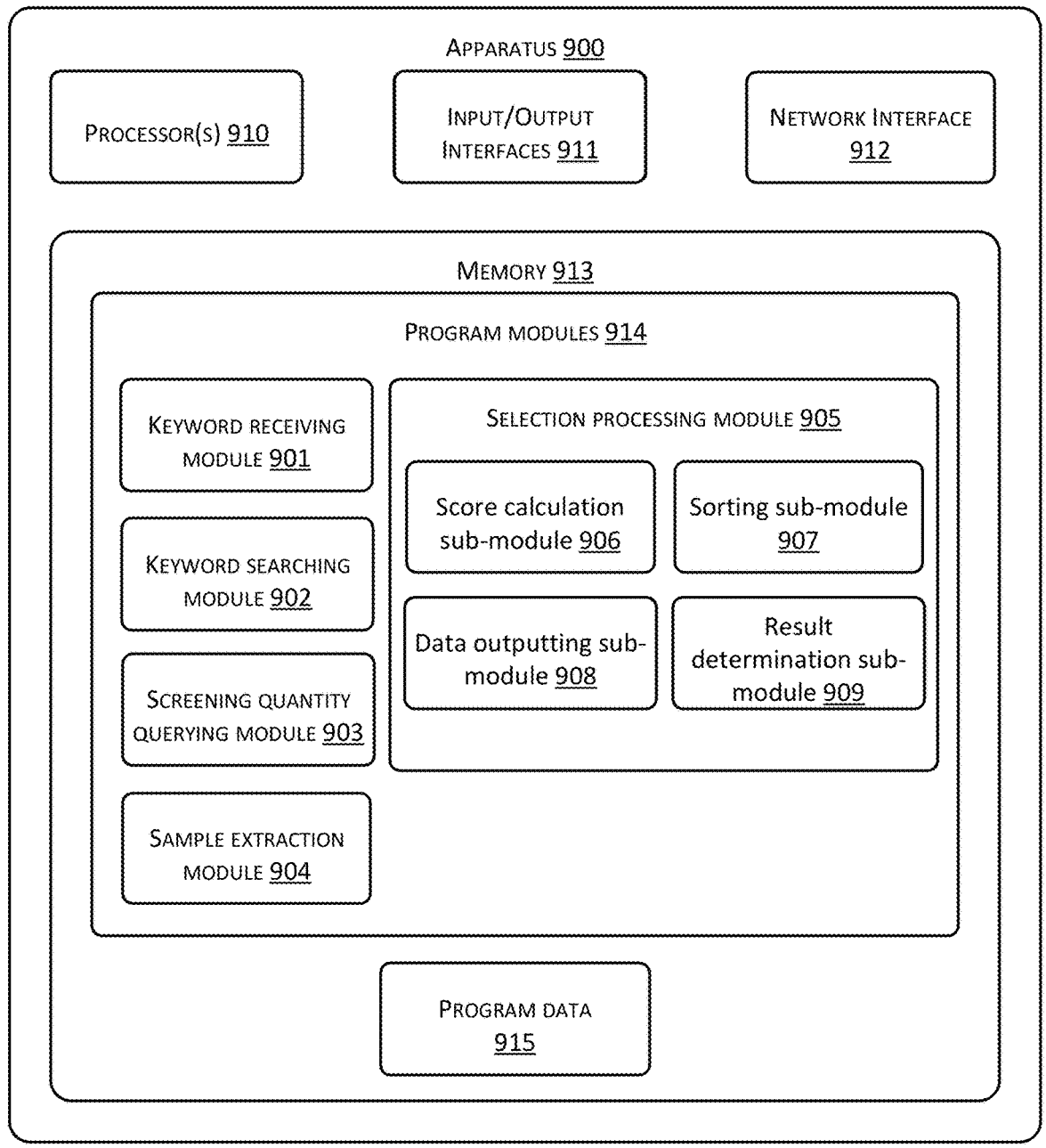
FIG. 9 is a structural diagram of an apparatus of searching for service object data in accordance with an embodiment of the present disclosure.

Referring to FIG. 9, a structural block diagram of an apparatus 900 of searching for service object data in accordance with an embodiment of the present disclosure is shown. The apparatus involves searching for service object data in a plurality of screening layers. In implementations, the apparatus 900 may include one or more computing devices. In implementations, the apparatus 900 may be a part of one or more computing devices, e.g., implemented or run by the one or more computing devices. In implementations, the one or more computing devices may be located in a single place or distributed among a plurality of network devices over a network. By way of example and not limitation, the apparatus 900 may include the following modules.

a keyword receiving module 901 used for receiving a search keyword;

a keyword searching module 902 used for searching for initial service object data that matches the search keyword;

a screening quantity querying module 903 used for querying a respective screening quantity of each screening layer associated with the search keyword;

a sample extraction module 904 used for extracting target sample features suitable for each screening layer from the initial service object data; and a selection processing module 905 used for selecting target service object data satisfying a screening quantity of a corresponding screening layer based on the target sample features.

In implementations, the selection processing module 905 may include the following sub-modules:

a score calculation sub-module 906 used for calculating respective scores of the initial service object data using the target sample features in a current screening layer;

a sorting sub-module 907 used for sorting the initial service object data according to the scores;

a data outputting sub-module 908 used for outputting the screening quantity of the sorted service object data to a next screening layer when the current screening layer is not a final screening layer; and a result determination sub-module 909 used for setting the screened service object data as target service object data when the current filter layer is the final screening layer.

In implementations, the apparatus 900 may also include one or more processors 910, an input/output (I/O) interface 911, a network interface 912, and memory 913.

The memory 913 may include a form of computer readable media as described in the foregoing description. In implementations, the memory 913 may include program modules 914 and program data 915. The program modules 914 may include one or more of the modules as described above with respect to FIG. 9.

Since the apparatus embodiments are basically similar to the method embodiments, a description is relatively simple. For related parts, reference may be made to respective portions of the description of the method embodiments.

Figure 10:
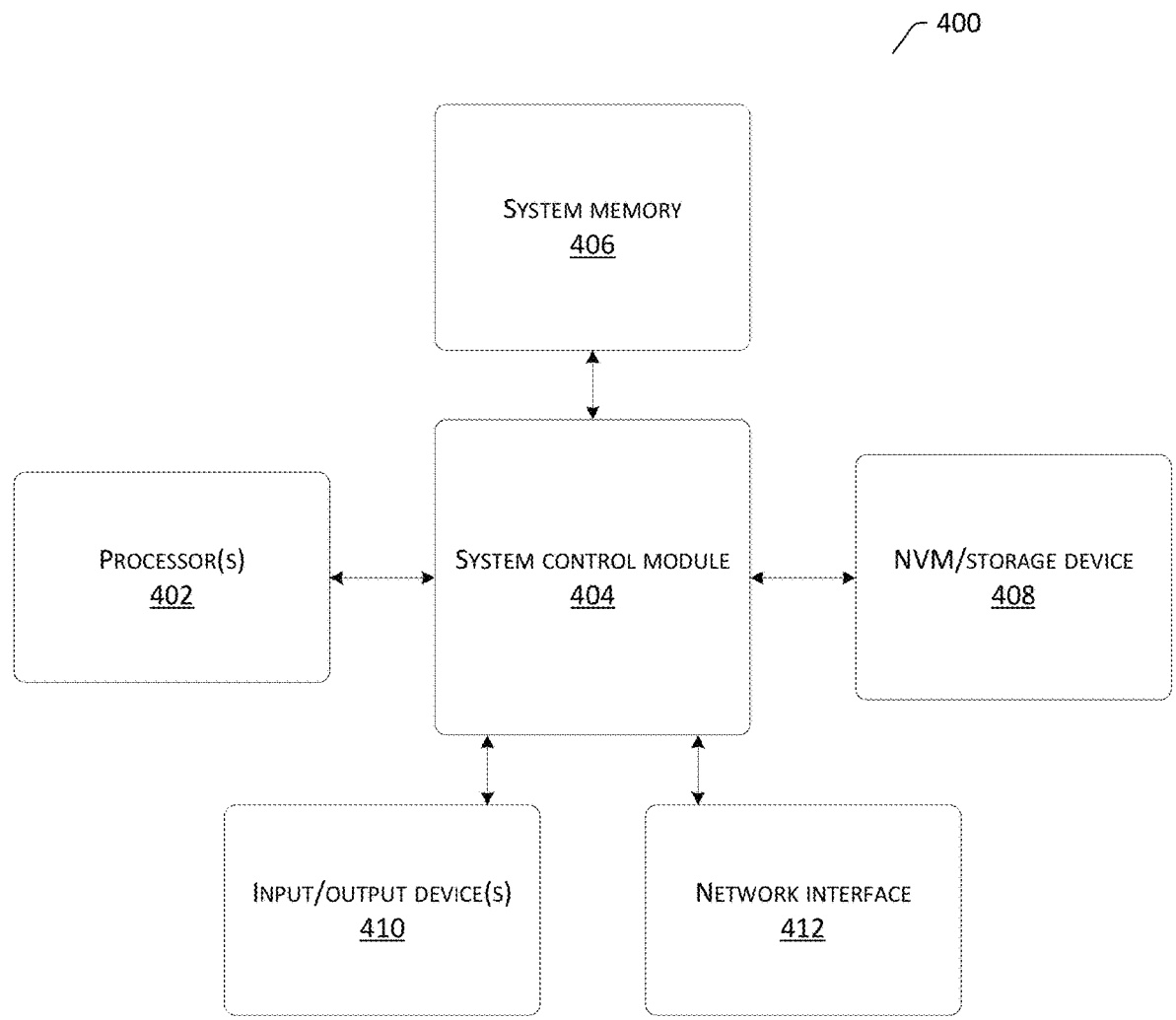
FIG. 10 is a structural diagram of a smart terminal in accordance with an embodiment of the present disclosure.

The embodiments of the present disclosure may be implemented as a system that uses any suitable hardware, firmware, software, or any combination thereof to perform a desired configuration. FIG. 10 schematically illustrates an exemplary apparatus (or system) 400 that may be used to implement the various embodiments described in the present disclosure.

In implementations, FIG. 10 shows an exemplary apparatus 400. The apparatus has one or more processors 402, a system control module (chipset) 404 coupled to at least one of the (one or more) processors 402, a system memory 406 coupled to the system control module 404, a non-volatile memory (NVM)/storage device 408 coupled to the system control module 404, and one or more input/output devices 410 coupled to the system control module 404, and a network interface 412 coupled to the system control module 406.

The processor 402 may include one or more single-core or multi-core processors. The processor 402 may include any combination of general-purpose processor(s) or special-purpose processor(s) (e.g., a graphics processor, an application processor, a baseband processor, etc.).

In implementations, the system 400 may include one or more computer-readable media (e.g., system memory 406 or a NVM/storage device 408) having instructions and the one or more processors 402 in combination with the one or more computer-readable media and configured to execute the instructions to implement module(s) to perform the actions described in the present disclosure.

In implementations, the system control module 404 may include any suitable interface controller to provide any suitable interface to at least one of the (one or more) processors 402 and/or any suitable device or component that communicates with the system control module 404.

The system control module 404 may include a memory controller module to provide an interface to the system memory 406. The memory controller module may be a hardware module, a software module, and/or a firmware module.

The system memory 406 may be used for loading and storing data and/or instructions for the system 400, for example. In one embodiment, the system memory 406 may include any suitable volatile memory, such as a suitable DRAM. In some embodiments, the system memory 406 may include double data rate type four-generation synchronous dynamic random access memory (DDR4 SDRAM).

In implementations, the system control module 404 may include one or more input/output controllers to provide an interface to the NVM/storage device 408 and (one or more) input devices 410.

For example, the NVM/storage device 408 may be used for storing data and/or instructions. The NVM/storage device 408 may include any suitable non-volatile memory (e.g., flash memory) and/or may include any suitable (one or more) nonvolatile storage devices (e.g., one or more hard disk drives (HDD), one or more compact disc (CD) drives, and/or one or more digital versatile disc (DVD) drives).

The NVM/storage device 408 may include a storage resource that is physically a part of a device installed in the system 400, or may be accessed by the device without necessarily being a part of the device. For example, the NVM/storage device 408 may be accessed via a network via the (one or more) input/output devices 410.

The (one or more) input/output devices 410 may provide an interface for the system 400 to communicate with any other suitable devices. The input/output devices 410 may include communication components, audio components, sensor components, and the like. The network interface 412 may provide an interface for the system 400 to conduct communications over one or more networks. The system 400 may conduct wireless communications with one or more components of a wireless network according to any one of one or more wireless network standards and/or protocols, such as accessing a wireless network based on a communication standard, such as WiFi, 2G, or 3G, or a combination thereof for wireless communications.

In implementations, at least one of the (one or more) processors 402 may be packaged with the logic of one or more controllers (e.g., memory controller modules) of the system control module 404. In one embodiment, at least one of the (one or more) processors 402 may be packaged with the logic of one or more controllers of the system control module 404 to form a system-in-package (SiP). In one embodiment, at least one of the (one or more) processors 402 may be integrated with the logic of one or more controllers of the system control module 404 on a same mold. In one embodiment, at least one of the (one or more) processors 402 may be integrated with the logic of one or more controllers of the system control module 404 on a same mold to form a system-on-a-chip (SoC).

In implementations, the system 400 may be, but is not limited to, a workstation, a desktop computing device, or a mobile computing device (e.g., a laptop computing device, a handheld computing device, a tablet, a netbook, etc.). In various embodiments, the system 400 may have more or fewer components and/or different architectures. For example, in some embodiments, the system 400 includes one or more cameras, keyboards, liquid crystal display (LCD) screens (including touch screen displays), non-volatile memory ports, multiple antennas, graphics chips, application specific integrated circuits (ASICs), and speakers.

The embodiments of the present disclosure further provide a non-volatile readable storage media. One or more modules (programs) are stored in the storage media. When the one or more modules are applied in a terminal device, the terminal device may be made to execute instructions of each method operation in the embodiments of the present disclosure.

In one example, an apparatus is provided and includes one or more processors, and one or more machine-readable media having instructions stored thereon that, when executed by the one or more processors, cause the apparatus to perform the method(s) in the embodiment(s) of the present disclosure.

In one example, one or more machine-readable media are also provided, which store instructions thereon that, when executed by one or more processors, cause the apparatus to perform method(s) in the embodiment(s) of the present disclosure.

Each embodiment in the present specification is described in a progressive manner, and each embodiment has an emphasis that is different from those of other embodiments. Same or similar parts among the embodiments can be referenced with each other.

One skilled in the art should understand that the embodiments of the present disclosure can be provided as a method, an apparatus, or a computer program product. Therefore, the embodiments of the present disclosure may take a form of a complete hardware embodiment, a complete software embodiment, or an embodiment that is a combination of software and hardware. Moreover, the embodiments of the present disclosure may take a form of a computer program product implemented in a form of one or more computer-usable storage media (which include, but are not limited to, a magnetic storage device, CD-ROM, an optical storage device, etc.) having computer-usable program codes embodied therein.

In a typical configuration, a computing device includes one or more processors (CPU), an input/output interface, a network interface, and memory. The memory may include a form of computer readable media such as a volatile memory, a random access memory (RAM) and/or a non-volatile memory, for example, a read-only memory (ROM) or a flash RAM. The memory is an example of a computer readable media. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The embodiments of the present disclosure are described with reference to flowcharts and/or block diagrams of methods, terminal devices (systems), and computer program products according to the embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing terminal device to produce a machine, such that an apparatus is created for implementing functions specified in one or more flows of a flowchart and/or one or more blocks of a block diagram through an execution of the instructions by the processor of the computer or other programmable data processing terminal device.

These computer program instructions may also be stored in a computer readable storage device capable of directing a computer or other programmable data processing terminal device to operate in a specific manner, so that instructions stored in the computer readable storage device generate an article of manufacture including an instruction apparatus.

The instruction apparatus implements functions specified in one or more flows of a flowchart and/or one or more blocks of a block diagram.

These computer program instructions may also be loaded onto a computer or other programmable data processing terminal device, such that a series of operating operations are performed on the computer or other programmable terminal device to generate a computer-implemented process. The instructions executed in the computer or other programmable terminal device provide operations for implementing functions specified in one or more flows of a flowchart and/or one or more blocks of a block diagram.

Although the exemplary embodiments of the embodiments of the present disclosure have been described, one skilled in the art can make additional changes and modifications to these embodiments once the basic inventive concepts are learned. Therefore, the appended claims are intended to be interpreted as including the exemplary embodiments and all changes and modifications that fall within the scope of the embodiments of the present disclosure.

Finally, it should also be noted that relational terms such as first and second, etc., are only used to distinguish one entity or operation from another entity or operation in the present text, and do not necessarily require or imply an existence of any such relationship or order between these operations or entities. Moreover, terms "include", "contain" or any other variations thereof are intended to cover a non-exclusive inclusion, such that a process, method, article, or terminal device that includes a series of elements includes not only these elements, but also includes other elements that are not explicitly listed, or also includes elements that are inherent in such process, method, article, or terminal device. Without any further limitation, an element defined by a statement "including a . . . " does not exclude a process, method, article, or terminal device including the element from further including another identical element.

A method of screening samples, a method of searching for service object data, a corresponding apparatus of screening samples, and a corresponding apparatus of searching for service object data that are provided in the present disclosure are described in detail above. The present text uses specific examples for illustrating the principles and implementations of the present disclosure. The description of the above embodiments is merely used for facilitating the understanding of the methods and the core ideas of the present disclosure. At the same time, for one of ordinary skill in the art, changes can be made to specific implementations and application scopes based on the ideas of the present disclosure. In summary, the content of the present specification should not be construed as limitations to the present disclosure.

The present disclosure can be further understood using the following clauses.

Clause 1: A sample screening method comprising: setting up a plurality of screening layers; selecting training samples needed by a current screening layer in the plurality of screening layers; extracting target sample features suitable for the current screening layer from the training samples; determining a screening quantity suitable for the current screening layer using the target sample features; and screening target samples based on the target sample features and the screening quantity.

Clause 2: The method of Clause 1, wherein: a number of the training samples needed by the current screening layer is more than a number of training samples needed by a next screening layer, the target sample features suitable for the current screening layer include target sample features suitable for a previous screening layer, and the screening quantity suitable for the current screening layer is greater than a screening quantity for the next screening layer.

Clause 3: The method of Clause 1 or 2, wherein the training samples are service object data matched with a search keyword, and the method further comprises generating an association relationship between the search keyword and the screening quantity.

Clause 4: The method of Clause 1 or 2, wherein extracting the target sample features suitable for the current screening layer from the training samples comprises: extracting original sample features from the training samples; determining original sample weights of the original sample features; generating cost-performance parameters based on the original sample weights; and extracting the target sample features from the original sample features according to the cost-performance parameters.

Clause 5: The method of Clause 4, wherein: the original sample weights are important degree factors of the original sample features with respect to preset first optimization target parameter, and generating the cost-performance parameters according to the original sample weights further comprises: pre-configuring cost coefficients of processing the original sample features; and calculating ratios between the original sample weights and the cost coefficients as the cost-performance parameters.

Clause 6: The method of Clause 5, wherein: the service object data is commodity data; the original sample features include commodity quality parameters, after-sales service evaluation parameters, conversion rates, and cheating score parameters of the commodity data; the first optimization target parameters include commodity data transaction volume; and the cost coefficients of processing the original sample features include time consumption, a memory application rate, and a CPU occupancy rate.

Clause 7: The method of Clause 1, 2, 5, or 6, wherein determining the screening quantity suitable for the current screening layer using the target sample features comprises: determining target sample weights of the target sample features; generating a screening probability that the training samples enter a next screening layer based on the target sample weights; and calculating the screening quantity of training samples to be screened at the current screening layer using the screening probability.

Clause 8: The method of Clause 7, wherein: the target sample weights are important degree factors of the target sample features with respect to preset second optimization target parameters, and the second optimization target parameters include one or more of the following: an accuracy rate of screening the training samples, a total cost factor used for processing training samples that enter the current screening layer, and a number of training samples that enter the last screening layer.

Clause 9: The method of Clause 7, wherein generating the screening probability that the training samples enter the next screening layer based on the target sample weights further comprises: calculating an inner product of the target sample weights for the target sample features of the current screening layer; and mapping the inner product into an interval of 0-1 to obtain the screening probability.

Clause 10: The method of Clause 8 or 9, wherein calculating the screening quantity of the training samples to be screened at the current screening layer using the screening probability further comprises: determining a baseline screening quantity, the baseline screening quantity being a screening quantity suitable for the previous screening layer;

and attenuating the screening probability based on the baseline screening quantity to obtain the screening quantity of the training samples to be screened at the current layer.

Clause 11: The method of Clause 1 or 2, further comprising: determining whether all preset screening layers are traversed; taking selected target samples as final samples if affirmative; and returning to the determining of the training samples needed by the current screening layer if not.

Clause 12: The method of Clause 11, further comprising: pushing the final samples to a user.

Clause 13: A method for searching service object data, wherein the method involves searching for the service object data in a plurality of screening layers, and comprises: receiving a search keyword; searching for initial service object data that matches the search keyword; querying a respective screening quantity of each screening layer associated with the search keyword; extracting target sample features suitable for each screening layer from the initial service object data; and selecting target service object data satisfying a screening quantity of a corresponding screening layer based on the target sample features.

Clause 14: The method of Clause 13, wherein selecting the target service object data meeting the screening quantity of the corresponding screening layer based on the target sample features comprises: calculating respective scores of the initial service object data using the target sample features in a current screening layer; sorting the initial service object data according to the scores; outputting the screening quantity of the sorted service object data to a next screening layer when the current screening layer is not a final screening layer; and setting the screened service object data as target service object data when the current filter layer is the final screening layer.

Clause 15: A sample screening method comprising: setting up a plurality of screening layers; extracting target sample features suitable for the plurality of screening layers according to a training objective; determining a screening quantity suitable for the plurality of screening layers using target sample features; and selecting target samples according to the target sample features and the screening quantity.

Clause 16: The method of Clause 15, wherein: the plurality of screening layers comprises at least two screening layers, a number of training samples needed by a previous screening layer is more than a number of training samples needed by a next screening layer, target sample features for the next screening layer include target sample features of the previous screening layer, and a screening quantity of the previous screening layer is greater than a screening quantity of the next screening layer.

Clause 17: A sample screening apparatus comprising: a screening layer setting module used for setting up a plurality of screening layers; a sample determination module used for selecting training samples needed by a current screening layer in the plurality of screening layers; a feature extraction module used for extracting target sample features suitable for the current screening layer from the training samples; a quantity calculation module used for determining a screening quantity suitable for the current screening layer using the target sample features; and a screening processing module used for screening target samples based on the target sample features and the screening quantity.

Clause 18: The apparatus of Clause 17, wherein: a number of the training samples needed by the current screening layer is more than a number of training samples needed by a next screening layer, the target sample features suitable for the current screening layer include target sample features suitable for a previous screening layer, and the screening quantity suitable for the current screening layer is greater than a screening quantity for the next screening layer.

Clause 19: The apparatus of Clause 17 or 18, wherein the training samples are service object data matched with a search keyword, and the apparatus further comprises: a relationship establishing module used for generating an association relationship between the search keyword and the screening quantity.

Clause 20: The apparatus of Clause 17 or 18, wherein the feature extraction module comprises: an original sample feature extraction sub-module used for extracting original sample features from the training samples; an original sample weight calculation sub-module used for determining original sample weights of the original sample features; a cost-performance parameter generation sub-module used for generating cost-performance parameters based on the original sample weights; and a target sample feature extraction sub-module used for extracting the target sample features from the original sample features according to the cost-performance parameters.

Clause 21: The apparatus of Clause 20, wherein the original sample weights are important degree factors of the original sample features with respect to preset first optimization target parameters, and the cost-performance parameter generation sub-module further comprises: a cost coefficient pre-configuration unit used for pre-configuring cost coefficients of processing the original sample features; and a cost-performance ratio calculation unit used for calculating ratios between the original sample weights and the cost coefficients as the cost-performance parameters.

Clause 22: The apparatus of Clause 17, 18 or 21, wherein the quantity calculation module comprises: a target sample weight calculation sub-module used for determining target sample weights of the target sample features; a screening probability generation sub-module used for generating a screening probability that the training samples enter a next screening layer based on the target sample weights; and a screening quantity calculation sub-module used for calculating the screening quantity of training samples to be screened at the current screening layer using the screening probability.

Clause 23: The apparatus of Clause 22, wherein the target sample weights are important degree factors of the target sample features with respect to preset second optimization target parameters, and the second optimization target parameters comprise one or more of the following: an accuracy rate of screening the training samples, a total cost factor used for processing training samples that enter the current screening layer, and a number of training samples that enter the last screening layer.

Clause 24: The apparatus of Clause 22, wherein the screening probability generation sub-module further comprises: an inner product calculation unit used for calculating an inner product of the target sample weights for the target sample features of the current screening layer; and a mapping unit used for mapping the inner product into an interval of 0-1 to obtain the screening probability.

Clause 25: The apparatus of Clause 23 or 24, wherein the screening quantity calculation sub-module further comprises: a baseline determination unit used for determining a baseline screening quantity, the baseline screening quantity being a screening quantity suitable for the previous screening layer; and an attenuation unit used for attenuating the screening probability based on the baseline screening quantity to obtain the screening quantity of the training samples to be screened at the current layer.

Clause 26: The apparatus of Clause 17 or 18, further comprising: a traversal module used for determining whether all preset screening layers are traversed, calling a final sample determination module if affirmative, and returning to call the sample determination unit if not; and the final sample determination module used for taking selected target samples as final samples.

Clause 27: An apparatus for searching service object data, wherein the apparatus involves searching for the service object data in a plurality of screening layers, and comprises: a keyword receiving module used for receiving a search keyword; a keyword searching module used for searching for initial service object data that matches the search keyword; a screening quantity querying module used for querying a respective screening quantity of each screening layer associated with the search keyword; a sample extraction module used for extracting target sample features suitable for each screening layer from the initial service object data; and a selection processing module used for selecting target service object data satisfying a screening quantity of a corresponding screening layer based on the target sample features.

Clause 28: The apparatus of Clause 27, wherein the selection processing module comprises: a score calculation sub-module used for calculating respective scores of the initial service object data using the target sample features in a current screening layer; a sorting sub-module used for sorting the initial service object data according to the scores; a data outputting sub-module used for outputting the screening quantity of the sorted service object data to a next screening layer when the current screening layer is not a final screening layer; and a result determination sub-module used for setting the screened service object data as target service object data when the current filter layer is the final screening layer.

Clause 29: An apparatus comprising: one or more processors, and one or more machine readable media storing instructions that, when executed by the one or more processors, cause the apparatus to perform the method of one or more of Clauses 1-16.

Clause 30: One or more machine readable media storing instructions that, when executed by one or more processors, cause an apparatus to perform the method of one or more of Clauses 1-16.

What is claimed is:

1. A method implemented by one or more computing devices, the method comprising:
    setting up a plurality of screening layers;
    selecting training samples needed by a current screening layer in the plurality of screening layers;
    extracting target sample features for the current screening layer from the training samples;
    determining a screening quantity for the current screening layer using the target sample features by:
        determining target sample weights of the target sample features,
        calculating an inner product of the target sample weights for the target sample features of the current screening layer,
        generating a screening probability that the training samples enter a next screening layer based on the target sample weights and the inner product, and
        calculating, as the screening quantity, a quantity of the training samples to be screened at the current screening layer using the screening probability; and
    screening target samples based on the target sample features and the screening quantity.

2. The method of claim 1, wherein:
    a number of the training samples needed by the current screening layer is more than a number of training samples needed by a next screening layer,
    the target sample features for the current screening layer include target sample features for a previous screening layer, and
    the screening quantity for the current screening layer is greater than a screening quantity for the next screening layer.

3. The method of claim 1, wherein the training samples are service object data matched with a search keyword, and the method further comprises generating an association relationship between the search keyword and the screening quantity.

4. The method of claim 1, wherein extracting the target sample features for the current screening layer from the training samples comprises:
    extracting original sample features from the training samples; determining original sample weights of the original sample features;
    generating cost-performance parameters based on the original sample weights; and
    extracting the target sample features from the original sample features according to the cost-performance parameters.

5. The method of claim 4, wherein:
    the original sample weights are important degree factors of the original sample features with respect to preset first optimization target parameter, and
    generating the cost-performance parameters according to the original sample weights further comprises:
        pre-configuring cost coefficients of processing the original sample features; and
        calculating ratios between the original sample weights and the cost coefficients as the cost-performance parameters.

6. The method of claim 5, wherein:
    the service object data is commodity data;
    the original sample features include commodity quality parameters, after-sales service evaluation parameters, conversion rates, and cheating score parameters of the commodity data;
    the first optimization target parameters include commodity data transaction volume; and
    the cost coefficients of processing the original sample features include time consumption, a memory application rate, and a CPU occupancy rate.

7. The method of claim 1, wherein:
    the target sample weights are important degree factors of the target sample features with respect to preset second optimization target parameters, and
    the second optimization target parameters include one or more of the following:
        an accuracy rate of screening the training samples,
        a total cost factor used for processing training samples that enter the current screening layer, and
        a number of training samples that enter the last screening layer.

8. The method of claim 1, wherein calculating the quantity of the training samples to be screened at the current screening layer using the screening probability further comprises:
    determining a baseline screening quantity, the baseline screening quantity being a screening quantity for a previous screening layer; and attenuating the screening probability based on the baseline screening quantity to obtain the screening quantity of the training samples to be screened at the current layer.

9. The method of claim 1, further comprising:
determining whether all preset screening layers are traversed;
taking selected target samples as final samples if affirmative; and
returning to the determining of the training samples needed by the current screening layer if not.

10. The method of claim 9, further comprising pushing the final samples to a user.

11. One or more computer readable media storing executable instructions that when executed by one or more processors, cause the one or more processors to perform acts comprising:
receiving a search keyword;
searching for initial service object data that matches the search keyword;
querying a respective screening quantity of each screening layer associated with the search keyword;
extracting target sample features for each screening layer from the initial service object data; and
selecting target service object data satisfying a screening quantity of a corresponding screening layer based on the target sample features,
wherein the screening quantity is trained by:
calculating target sample weights of respective target sample features of the corresponding screening layer based on a preset optimization target parameter;
calculating inner products of the target sample weights for the respective target sample features of the corresponding screening layer as screening probabilities that training samples are screened and selected into a next screening layer through the corresponding screening layer; and
calculating the screening quantity of the training samples that screened through the corresponding screening layer to enter a next screening layer using the screening probabilities.

12. The one or more computer readable media of claim 11, wherein selecting the target service object data meeting the screening quantity of the corresponding screening layer based on the target sample features comprises:
calculating respective scores of the initial service object data using the target sample features in a current screening layer;
sorting the initial service object data according to the scores;
outputting the screening quantity of the sorted service object data to a next screening layer when the current screening layer is not a final screening layer; and
setting the screened service object data as target service object data when the current filter layer is the final screening layer.

13. The one or more computer readable media of claim 12, the acts further comprising pushing the target service object data to a client for display to a user.

14. The one or more computer readable media of claim 13, wherein the preset optimization target parameter includes one or more of an accuracy of screening service object data, a total cost coefficient for processing the training samples that enter the corresponding screening layer, or a number of training samples entering a final screening layer.

15. The one or more computer readable media of claim 13, wherein the target sample weights of the respective target sample features are further calculated based on one or more of a click rate, a transaction volume, or a sales volume.

16. An apparatus comprising:
one or more processors;
memory storing executable instructions that, when executed by the one or more processors, cause the one or more processors to perform acts comprising:
setting up a plurality of screening layers;
selecting training samples needed by a current screening layer in the plurality of screening layers;
extracting target sample features for the current screening layer from the training samples;
determining a screening quantity for the current screening layer using target sample features by:
determining target sample weights of the target sample features,
calculating an inner product of the target sample weights for the target sample features of the current screening layer,
generating a screening probability that the training samples enter a next screening layer based on the target sample weights and the inner product, and
calculating, as the screening quantity, a quantity of the training samples to be screened at the current screening layer using the screening probability; and
selecting target samples according to the target sample features and the screening quantity.

17. The apparatus of claim 16, wherein:
the plurality of screening layers comprises at least two screening layers,
a number of training samples needed by a previous screening layer is more than a number of training samples needed by a next screening layer,
target sample features for the next screening layer include target sample features of the previous screening layer, and
a screening quantity of the previous screening layer is greater than a screening quantity of the next screening layer.

18. The apparatus of claim 16, wherein the training samples are service object data matched with a search keyword, and the method further comprises generating an association relationship between the search keyword and the screening quantity.

19. The apparatus of claim 16, wherein:
the target sample weights are important degree factors of the target sample features with respect to preset second optimization target parameters, and
the second optimization target parameters include one or more of the following:
an accuracy rate of screening the training samples,
a total cost factor used for processing training samples that enter the current screening layer, and
a number of training samples that enter the last screening layer.

20. The apparatus of claim 16, wherein calculating the quantity of the training samples to be screened at the current screening layer using the screening probability further comprises:
determining a baseline screening quantity, the baseline screening quantity being a screening quantity for a previous screening layer; and
attenuating the screening probability based on the baseline screening quantity to obtain the screening quantity of the training samples to be screened at the current layer.

* * * * *